United States Patent
Dhiman et al.

(10) Patent No.: US 11,425,460 B1
(45) Date of Patent: Aug. 23, 2022

(54) SELECTIVE STREAMING BASED ON DYNAMIC PARENTAL RATING OF CONTENT

(71) Applicant: Rovi Guides, Inc., San Jose, CA (US)

(72) Inventors: Rohit Dhiman, Uttarakhand (IN); Ashish Gupta, Karnataka (IN); Vaibhav Gupta, Karnataka (IN); Senthil Kumar Karuppasamy, Bangalore (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/161,916

(22) Filed: Jan. 29, 2021

(51) Int. Cl.
*H04N 21/454* (2011.01)
*H04N 21/845* (2011.01)
*H04N 21/2387* (2011.01)
*H04N 21/488* (2011.01)
*H04N 21/234* (2011.01)
*H04N 21/2343* (2011.01)

(52) U.S. Cl.
CPC ..... *H04N 21/4542* (2013.01); *H04N 21/2387* (2013.01); *H04N 21/23418* (2013.01); *H04N 21/23439* (2013.01); *H04N 21/4884* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 7,146,627 B1 * | 12/2006 | Ismail | H04N 21/4663 725/35 |
| 8,484,679 B1 * | 7/2013 | Chtchedrina | H04N 21/8456 725/42 |
| 8,793,721 B1 * | 7/2014 | Sharkey | H04N 21/4542 725/27 |
| 9,781,077 B2 | 10/2017 | Mikhailov et al. | |
| 10,671,854 B1 | 6/2020 | Mahyar et al. | |
| 10,945,005 B2 * | 3/2021 | Kahn | H04N 21/4532 |
| 2006/0064715 A1 | 3/2006 | Poslinski | |

(Continued)

FOREIGN PATENT DOCUMENTS

| | | |
|---|---|---|
| EP | 3289767 B1 | 6/2019 |
| WO | 2016179013 A1 | 11/2016 |

OTHER PUBLICATIONS

U.S. Appl. No. 17/161,917, filed Jan. 29, 2021, Rohit Dhiman.

*Primary Examiner* — Alexander Q Huerta
(74) *Attorney, Agent, or Firm* — Haley Guiliano LLP

(57) ABSTRACT

Systems and methods are described to selectively stream content based on parental control ratings. At a client device, a manifest identifying sequential segments of a media asset and versions of a particular segment of the sequential segments may be received, and a graphical user interface may be generated for display to simultaneously depict a respective portion of each respective version of the particular segment and respective selectable options associated with each respective version of the particular segment. A selection of a first option may be received that is associated with a first version of the particular segment, and during playing of the media asset, in response to determining that the particular segment is the next segment to be played, the first version of the particular segment may be requested from the server.

20 Claims, 12 Drawing Sheets

(56) References Cited

U.S. PATENT DOCUMENTS

| | | | |
|---|---|---|---|
| 2006/0130119 A1* | 6/2006 | Candelore | H04N 21/4751 725/135 |
| 2006/0130121 A1* | 6/2006 | Candelore | H04N 21/8541 725/115 |
| 2008/0040380 A1* | 2/2008 | Miyaki | G11B 27/036 707/999.102 |
| 2009/0133089 A1* | 5/2009 | Ku | H04N 21/4542 725/131 |
| 2013/0291004 A1 | 10/2013 | Yuan et al. | |
| 2015/0128161 A1* | 5/2015 | Conrad | H04N 21/42201 725/12 |
| 2015/0293675 A1* | 10/2015 | Bloch | G11B 27/34 715/723 |
| 2016/0094888 A1* | 3/2016 | Peterson | H04N 21/8456 725/39 |
| 2017/0161772 A1 | 6/2017 | Xu et al. | |
| 2018/0376203 A1 | 12/2018 | Gonzalez | |
| 2018/0376205 A1* | 12/2018 | Oswal | G02B 27/0172 |
| 2020/0183773 A1 | 6/2020 | Brehm | |
| 2021/0193181 A1* | 6/2021 | Shiga | G11B 27/02 |

* cited by examiner

US 11,425,460 B1

SELECTIVE STREAMING BASED ON DYNAMIC PARENTAL RATING OF CONTENT

BACKGROUND

This disclosure is directed to selectively streaming content based on parental control ratings. In particular, techniques are disclosed for enabling selection of one of multiple versions of a portion of a media asset to be displayed, and analyzing a live broadcast to determine whether an upcoming frame is associated with a parental control rating.

SUMMARY

Media content has become increasingly accessible to users via a multitude of devices and platforms. It is often desirable for a first user (e.g., a parent) to restrict access of a second user (e.g., a child) to certain media content that may be inappropriate for the second user to consume. In one approach, a content provider stores multiple copies of the same media content, where one copy is edited from its original form to remove or modify portions of the content that may be inappropriate for users of certain ages, and the user may request such modified copy of the media asset for their children to view. However, in such approach the content provider often stores multiple copies of each media asset, even if there are only minor differences between the original copy of the media asset and the modified copies, which may be a burden on the content provider's storage and processing resources. This may be particularly burdensome if multiple copies of each version need to be stored (e.g., both edited and unedited versions may need to be stored in multiple bit rated encodings). In addition, such approach is often inflexible in that a user device set to a particular parental rating may be forbidden to view certain content even if only a small portion of the content does not comply with the parental rating, such as if only one copy of the content is available. Further, a user selecting the copy of the media asset may be completely reliant on the content provider to determine which potentially objectionable scenes to modify or remove, even though different users may have different preferences about what is appropriate or desirable for their children to see.

In another approach, a parent may set certain parental ratings to block a child's access to certain broadcast programming (e.g., a movie with an "R" rating). However, such systems may be inadequate in the context of live broadcasts. For example, a child may be exposed to profane language or nudity that unexpectedly occurs during a live broadcast of a sporting event (e.g., a soccer game). Alternatively, the live broadcast may be subjected to a time delay to allow for censorship by human reviewers of inappropriate content. However, such approach may be costly (e.g., to compensate a human reviewer for his or her time). In addition, this approach may be undesirable because the user may receive a notification (e.g., from a mobile application tracking the score of the soccer game, or a friend who is watching the soccer game without such time delay) that a goal was scored in the soccer game during such time delay, which detracts from the suspense and excitement of watching a live sporting event (e.g., since the user knows a goal is about to be scored based on such notification). Moreover, some users may not want to receive a censored version of the live broadcast.

To overcome these problems, systems and methods are provided herein for enabling selection of one of multiple versions of a portion of a media asset to be displayed. A client device may receive from a server a manifest of a media asset, where such manifest identifies (a) a plurality of sequential segments of the media asset and (b) a plurality of versions of a particular segment of the plurality of sequential segments. The client device may generate for display a graphical user interface (GUI) that simultaneously depicts a respective portion of each respective version of the plurality of versions of the particular segment, and a plurality of selectable options, where each respective selectable option of the plurality of selectable options is associated with a respective version of the particular segment. The client device may receive a selection of a first option, of the plurality of selectable options, that is associated with a first version of the plurality of versions of the particular segment. During playing of the media asset, in response to determining that the particular segment of the plurality of sequential segments is the next segment to be played, the client device may request from the server the first version of the particular segment (e.g., using an address of the selected segment from the manifest). In some embodiments, multiple segments in the media asset may have multiple respective versions, and the client device may request a particular version for each of such multiple segments having multiple respective versions.

In addition, to overcome these problems, systems and methods are provided herein for transmitting, from a server to a client device, a manifest of a media asset, where the manifest identifies (a) a plurality of sequential segments of the media asset and (b) a plurality of versions of a particular segment of the plurality of sequential segments. The server may cause the client device to generate for display a GUI that simultaneously depicts a respective portion of each respective version of the plurality of versions of the particular segment, and a plurality of selectable options, where each respective selectable option of the plurality of selectable options is associated with a respective version of the particular segment. The server may receive a selection of a first option, of the plurality of selectable options, that is associated with a first version of the plurality of versions of the particular segment. During playing of the media asset, in response to receiving an indication that the particular segment of the plurality of sequential segments is the next segment to be played, the server may transmit to the client device the first version of the particular segment.

Such aspects enable selection of one or more versions of segments of a media asset to create a custom playlist for the media asset. For example, certain users may be interested in consuming content with their children, but may not desire for their children to hear profane language or view scenes with nudity, while at the same time may desire to view portions of the content depicting consumption of alcohol (e.g., if the user would like to use the scene to initiate a conversation about responsible drinking with their children). Thus, the user may be shown multiple versions of particular segments (e.g., where at least one of the versions depicts potentially objectionable content) and given the opportunity to selectively choose which versions to include in the presentation of the media asset. In some embodiments, playlists of the selected versions of one or more segments of the media asset may be saved by the user (e.g., for use by multiple users in the user's household and/or associated with a profile of the user), and such playlists may be shared or posted by the user (e.g., shared with friends of the user via email, text message, via the Internet or other computer network, and/or posted in connection with a social media profile of the user). In addition, such aspects enable storing media assets to be less burdensome for content providers in that instead of storing multiple copies of a media asset that only have minor differences, the content provider need not store duplicate portions of the media asset (e.g., that do not contain objectionable content) and may instead store multiple versions of certain portions (e.g., portions with objectionable content).

In addition, to overcome these problems, systems and methods are provided herein for analyzing a live broadcast to determine whether an upcoming frame is associated with a parental control rating, and performing a suitable action based on the determination. A streaming application identifies a particular frame of a live broadcast of a media asset that is to be transmitted to a first device, and determines (e.g., using pre-trained artificial intelligence models, or other processing techniques) that the particular frame of the media asset depicts content associated with a parental control rating. In response to the determining that the particular frame of the media asset depicts content associated with the parental control rating, the streaming application transmits to the first device (a) the particular frame and (b) metadata associated with the particular frame that indicates that the particular frame depicts content associated with the parental control rating. The transmittal of the metadata causes the first device to perform an action related to display of the particular frame based on comparing the parental control rating with a local parental control setting.

Such aspects enable monitoring upcoming portions of live broadcast content, and the performing of a suitable ameliorative action (e.g., displaying other content such as an advertisement or other supplemental content in place of the potentially objectionable content, displaying blank or dark frames in place of the content, displaying placeholder frames, etc.) consistent with local parental control settings. Thus, even in the event that a user is consuming seemingly innocuous programming (e.g., a soccer match), suitable actions may be taken to account for potentially objectionable content that is unexpectedly presented (e.g., nudity or profanity) during the programming. In some embodiments, the local parental control setting is based on a profile of a user viewing the live broadcast of the media asset.

In some embodiments, the GUI, which may simultaneously depict the respective portion of each respective version of the plurality of versions of the particular segment and the plurality of selectable options, where each respective selectable option of the plurality of selectable options is associated with a respective version of the particular segment, may further depict parental control information for each respective portion of each respective version of the plurality of versions of the particular segment. Such parental information is identified in the manifest and indicates at least one of the versions of the plurality of versions of the particular segment contains potentially objectionable content.

In some aspects of this disclosure, each respective portion comprises a key frame from each respective version of the particular segment, where the key frame comprises potentially objectionable content associated with the respective portion. The respective portion may further comprise subtitle information associated with the potentially objectionable content of the respective version of the particular segment. Each respective portion may alternatively or additionally comprise an animation or trick play content associated with the respective portion.

In some embodiments, the playing of the media asset occurs at a device other than the client device. For example, a playlist may be created based on selection of versions of segments of a media asset received from a first user (e.g., a parent) at a first device (e.g., a mobile device) and content may be presented to the first user and a second user (e.g., a child of the parent) at a second device (e.g., a television).

In some aspects of this disclosure, the client device may transmit a request to play the media asset, and receive, without generating for display the GUI, an initial segment of the plurality of segments comprising the particular segment.

In some embodiments, the streaming application trains a machine learning model to accept as input a frame of a media asset and output a determination of whether the content depicted by the frame is associated with a parental control rating. Such machine learning model may be leveraged to determine whether the particular frame of the media asset depicts content associated with a parental control rating, e.g., by inputting the particular frame of the media asset into the trained machine learning model. In some embodiments, the machine learning model may be a neural network.

In some aspects of this disclosure, performing the action related to display of the particular frame comprises replacing the particular frame with a predetermined frame, in response to determining, based on the comparison, that the parental control rating is not compatible with the local parental control setting. The predetermined frame may be an advertisement and/or supplemental content (e.g., interactive content, content related to the media asset, etc.).

In some embodiments, performing the action related to display of the particular frame comprises obscuring the particular frame, in response to determining, based on the comparison, that the parental control rating is not compatible with the local parental control setting.

In some aspects of this disclosure, performing the action related to display of the particular frame comprises permitting the particular frame to be presented, in response to determining, based on the comparison, that the parental control rating is compatible with the local parental control setting.

In some embodiments, in response to determining, based on the comparison, that the parental control rating is not compatible with the local parental control setting, the streaming application causes the first device to present a prompt to enter authentication credentials to view the particular frame of the media asset.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the above.

As referred to herein, the term "manifest" should be understood to refer to a file and/or a data structure containing information about sequential segments (comprising sequential frames) of a media asset that is available to a client device. Such information may include, e.g., a number of segments in a playlist, bit rates of each segment, codecs associated with each segment, resolution of each segment, parental rating associated with each segment, timing of each segment, location on the network (e.g., network 806 of FIG. 8) where a segment may be retrieved, bandwidth of each segment, video tracks of each segment, audio tracks of each segment, subtitle tracks of each segment, captions of each segment, languages of each segment, metadata associated with each segment, etc.

The manifest may be employed in any of a variety of streaming protocols, e.g., media presentation description (MPD) files for Dynamic Adaptive Streaming over HTTP (MPEG-DASH), m3u8 files for HTTP Live Streaming (HLS), f4m files for HTTP Dynamic Streaming (HDS), ingest files for CMAF (Common Media Application Format), manifest files for Microsoft Smooth Streaming (MSS), etc. The manifest may be a standard manifest (e.g., an MPD file from MPEG-DASH) or may be a modified version of a standard manifest. A segment may comprise information (e.g., encoded video, audio, subtitle information, error correction bits, error detection bits, etc.) for a particular interval of a media asset, and each segment may correspond to a file specified in the manifest indicating an associated URL for retrieving the file. The segment may comprise a collection or sequence of frames (e.g., still images that together make up moving pictures of scenes of a portion of a media asset), and each segment may have a specific length (e.g., from zero to a few seconds). In the segment-based delivery of media content using the above-mentioned streaming protocols, various techniques may be employed (e.g., MPEG-2 Transport stream format, MPEG-4 format such as the fragmented MPEG-4 format).

Figure 1:
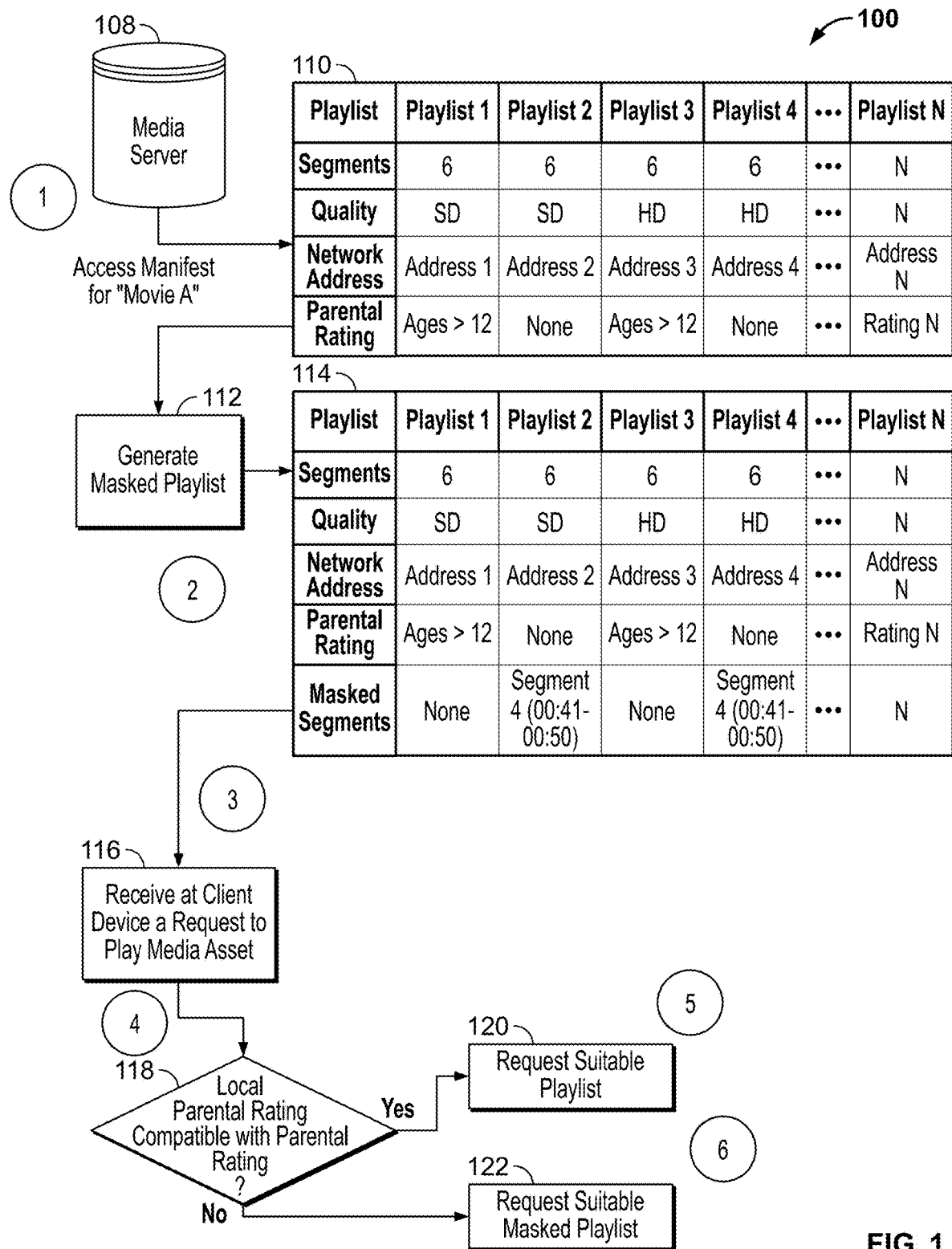
FIG. 1 shows a block diagram for masking one or more segments of a media asset based on a parental control rating, in accordance with some embodiments of this disclosure.

FIG. 1 shows a block diagram 100 for masking one or more segments of a media asset based on a parental control rating, in accordance with some embodiments of this disclosure. Manifest 110 for a media asset (e.g., "Movie A") may be stored at media server 108 (e.g., server 804 of FIG. 8). An exemplary manifest is shown below, where "Playlist 1" of manifest 110 may correspond to "sd/gear_parental/prog_index.m3u8" (SD content with a parental rating of "restricted to ages above 12 years old"); "Playlist 2" of manifest 110 may correspond to "sd/gear/prog_index.m3u8" (SD content with no parental control rating); "Playlist 3" of manifest 110 may correspond to "hd/gear_parental/prog_index.m3u8" (HD content with a parental rating of "restricted to ages above 12 years old"; and "Playlist 4" of manifest 110 may correspond to "hd/gear/prog_index.m3u8" (HD content with no parental control rating):

EXTM3U
EXT-X-STREAM-INF:PROGRAM-ID=1, BANDWIDTH-30000, PARENTAL-RATING=12, CODECS="mp4a.40.2,
avc1.4d4015"
sd/gear_parental/prog_index.m3u8
EXT-X-STREAM-INF:PROGRAM-ID=1, BANDWIDTH-30000, CODECS="mp4a.40.2, avc1.4d4015"
sd/gear/prog_index.m3u8
EXT-X-STREAM-INF:PROGRAM-ID=1, BANDWIDTH=100000, PARENTAL-RATING=12, CODECS="mp4a.40.2,
avc1.4d401e"
hd/gear_parental/prog_index.m3u8
EXT-X-STREAM-INF:PROGRAM-ID=1, BANDWIDTH-1000000, CODECS="mp4a.40.2, avc1.4d401e"
hd/gear/prog_index.m3u8

At 112, the streaming application (e.g., running at least in part on media server 108) may generate a masked playlist 114 (e.g., for "Playlist 2" and "Playlist 4" of manifest 110). For example, the streaming application may determine that one or more segments correspond to objectionable content (e.g., have a parental control rating higher than a local parental control setting at the client device, such as a rating higher than "G": appropriate for all viewers). The streaming application may perform such determination of whether one or more segments contains objectionable content based on information received from a content provider (e.g., metadata received from media content source 802 of FIG. 8, and/or metadata received from a film rating organization), or based on machine learning techniques, as discussed in further detail in connection with FIG. 6, or other techniques (e.g., image processing and audio processing of frames to identify key features, and comparison to a database of known features having a particular content rating).

As shown below, upon determining that a particular segment contains objectionable content, the streaming application may apply masking to such a segment (e.g., Segment 4 from 00:41-00:50) of each playlist without a parental rating. In some embodiments, the streaming application may not perform masking on segments included in playlists having a parental rating (e.g., "Playlist 1" and "Playlist 3" of manifest 110) since such segments may have already been modified to comply with the associated parental rating. Alternatively, the streaming application may generate masked versions of the playlists having the parental ratings (e.g., certain segments of "Playlist 1" and "Playlist 3" may be masked, such as segments having a rating higher than a predefined rating of "G", to generate masked playlists "Playlist 2" and "Playlist 4").

Masking may be performed by the streaming application using various techniques (e.g., by masking bits associated with video, audio and subtitles of the stream to 0 in certain bit positions, or removing the particular segment or frames from the playlist). In some embodiments, such aspects may alleviate the burden on a content provider's storage and/or processing resources by enabling such content provider to maintain a masked version of a playlist (e.g., a masked version of "Playlist 1") by leveraging stored segments from the unmasked version. For example, since the segments of the masked version of "Playlist 1" may be, aside from the one or more masked segment(s), the same as the segments of the unmasked version of "Playlist 1," only such masked segments may need to be stored to form the unmasked playlist.

sd/gear_parental/prog_index.m3u8
EXTM3U
EXT-X-TARGETDURATION:10
EXT-X-VERSION:3
EXT-X-MEDIA-SEQUENCE:0
EXT-X-PLAYLIST-TYPE:VOD
EXTINF:10.0,
fileSequence0.ts
EXTINF 10.0,
fileSequence1.ts
EXTINF: 10.0,
fileSequence2.ts
EXTINF: 10.0,
fileSequence3.ts
EXTINF 10.0,
fileSequence4.ts
EXTINF: 10.0,
fileSequence5.ts
EXT-X-ENDLIST
sd/gear/prog_index.m3u8
EXTM3U
EXT-X-TARGETDURATION: 10
EXT-X-VERSION: 3
EXT-X-MEDIA-SEQUENCE:0
EXT-X-PLAYLIST-TYPE:VOD
EXTINF: 10.0,
fileSequence0.ts
EXTINF: 10.0,
fileSequence1.ts
EXTINF 10.0,
fileSequence2.ts
EXTINF: 10.0,
fileSequence3.ts
EXTINF: 10.0,
masked_fileSequence4.ts//content between 41-50 seconds masked, stored as different segment
EXTINF: 10.0,
fileSequence5.ts
EXT-X-ENDLIST At 116, manifest 114 (e.g., specifying one or more masked playlists) may be provided to a client device (e.g., client device 202 of FIG. 2, or another client device associated with the user, e.g., client device 202 may be utilized as a second screen to direct the media asset to be presented on another device in a vicinity of the user and/or in a home network of the user) from media server 108 in response to receiving a user request to play the media asset.

At 118, the streaming application (e.g., running at least in part on the client device) may check for a local parental rating at the client device, and determine whether any of the playlists included in manifest 114 are compatible with the local parental rating.

For example, the streaming application may determine that the local parental rating at the client device either does not exist, or is compatible with unmasked playlists of manifest 114 (e.g., the local parental rating may allow all content appropriate for ages 14 and over). In such instance, at 120 the client device may request a suitable playlist (e.g., the unmasked version of "Playlist 2" or the unmasked version of "Playlist 4").

On the other hand, the streaming application may determine that the local parental rating is incompatible with one or more playlists (e.g., the local parental rating may restrict viewing of content having a rating of "ages 5 and over"). In such instance, the client device at 122 may request a suitable masked playlist (e.g., the masked version of "Playlist 2" or the masked version of "Playlist 4").

The masked content may take one of various forms (e.g., display of a blank or dark screen). In some embodiments, the streaming application may skip the objectionable content or substitute other content (e.g., retrieve from the media server advertisements directed to a younger audience consistent with the local parental rating, supplemental content related to the media asset such as alternative scenes and/or audio of the media asset, interactive content, etc.) for the objectionable content. Such processing may be performed on any number of segments of the media asset determined to be incompatible with the local parental control setting. In some embodiments, the content substituted for the original objectionable content may have an identical time duration as the time duration of the segment at issue in the media asset. Additionally or alternatively, the streaming application may provide a notification to the user via a GUI indicating that the substituted content is about to end, and that the media asset is set to resume from the next segment, unless the user selects an option to continue the substituted content. The client device may then seamlessly transition to the next segment.

In some embodiments, the streaming application may enable (e.g., automatically, such as based on changing network conditions, or based on user input) switching between different parental rating-based tracks depending on user selection (e.g., during playing of the media asset, on a segment-by-segment or frame-by-frame basis). For example, the streaming application may generate for presentation a prompt at the client device enabling entry of a password or PIN to view a particular segment (e.g., and an indication that the particular segment will be masked unless the correct password or PIN is provided). In some embodiments, the streaming application may aggregate information about different parental tracks available to the client device (e.g., prior to beginning to play the media asset) to enable to user to select content with less strict parental controls (e.g., provided entry of the correct parental control password is received from the user).

In some embodiments, the streaming application may store and/or transmit the original content that is being masked out or replaced for access at the client device (or another device associated with the user), e.g., so a parent may watch the scene on his or her mobile device when his or her child (e.g., consuming the masked-out content) is not around. In some embodiments, the streaming application may generate for display a prompt for a password or PIN (e.g., associated with the local parental control setting) where entry of such password or PIN (prior to the objectionable segment, or during the period in which masked-out or replacement content is being presented) may permit the objectionable segment (e.g., segment 4 in FIG. 1) to be generated for presentation (e.g., to override the local parental control setting). In some embodiments, the client device may receive a notification on his or her phone indicating that objectionable content is contained in an upcoming or imminent segment, to permit the user to take action (e.g., request specific replacement content, enter his or her password or PIN to override the local parental setting, etc.).

Figure 2:
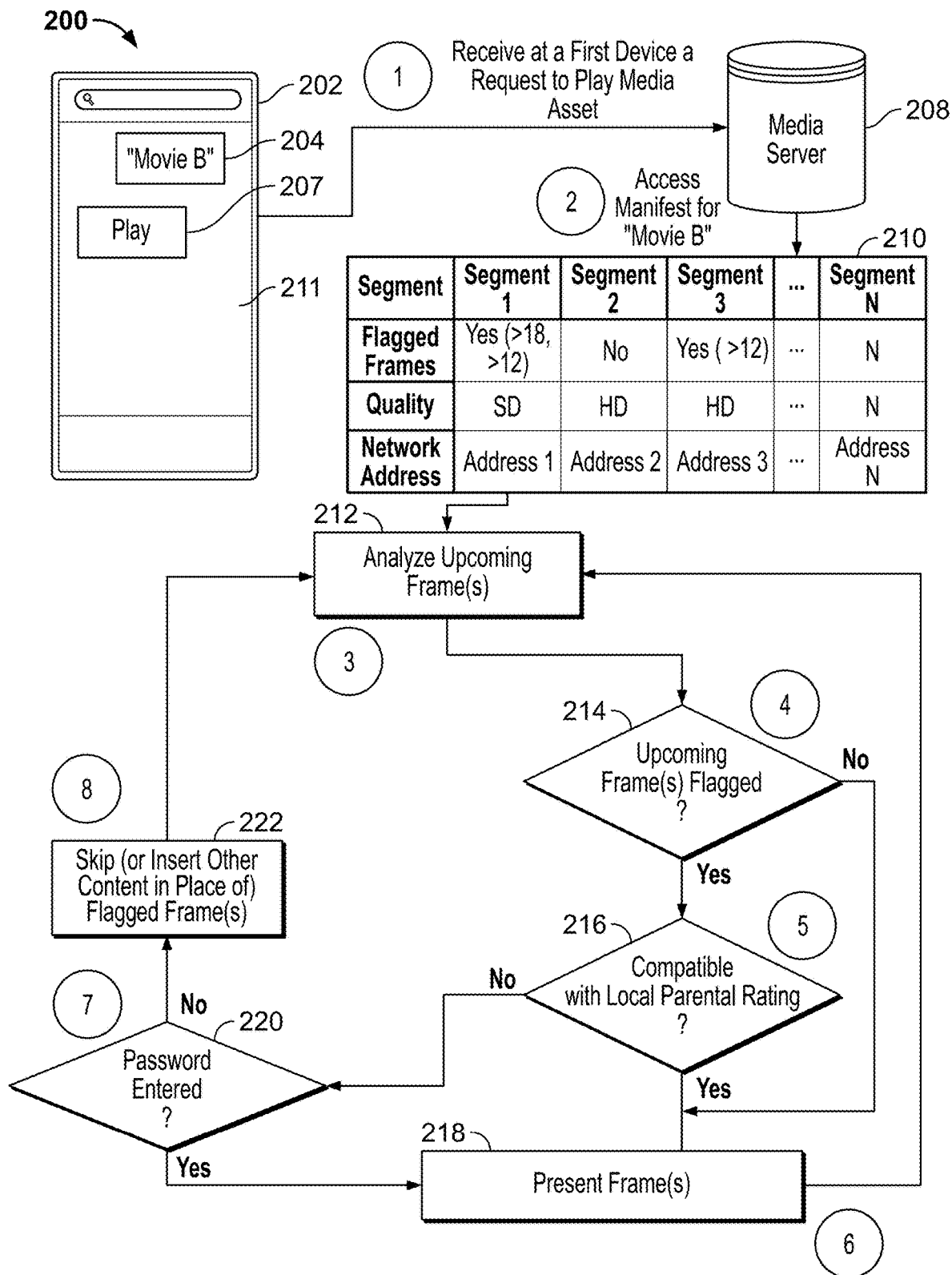
FIG. 2 shows a block diagram for skipping one or more frames of a media asset based on a parental control rating, in accordance with some embodiments of this disclosure.

FIG. 2 shows a block diagram 200 for skipping one or more frames of a media asset based on a parental control rating, in accordance with some embodiments of this disclosure. The streaming application running at least in part on client device 202 (e.g., computer device 807, mobile device 808, television 810 of FIG. 8) may generate for presentation GUI 211 to enable user selection to play a media asset (e.g., "Movie B" associated with media listing 204). Upon receiving selection of option 207 to play such media asset, the request may be transmitted to media server 208 (e.g., server 804 of FIG. 8). Media server 208 may access manifest 210 of the media asset (e.g., stored at media server 208, or an associated database). Manifest 210 may specify one or more segments of the requested media asset. For example, manifest 210 indicates "segment 1" comprises one or more frames flagged as having a parental control rating indicating potentially objectionable content (e.g., a collection or sequence of frames inappropriate for viewers under age 18, and a collection or sequence of frames inappropriate for viewers under age 12). A frame rate of the requested asset may be, for example, 60 frames per second (e.g., a 4-second segment may include 240 frames).

The parental rating may be provided by a content provider (e.g., media content source 802 of FIG. 8) or another film rating organization, or may be assigned by the streaming application based on machine learning, as discussed in further detail in connection with FIG. 6, or using other techniques. The streaming application may analyze the media asset on a frame-by-frame basis to determine parental control ratings, and an indicator may be associated with one or more frames based on the analysis (e.g., particular bits may be associated with frames to indicate whether a frame is suitable for all viewers, only viewers in a certain age range, etc.). For example, for a media asset, the majority of the frames may be assigned a first bit value (e.g., indicating such frames are suitable for all viewers), and other portions of the media asset may be assigned a second bit value (e.g., indicating the frames of such portion are not suitable for viewers under the age of 12) and the remaining portions may be assigned a third bit value (e.g., indicating the frames of such portion are not suitable for viewers under the age of 18). In some embodiments, a bit value may correspond to different parental control ratings based on region (e.g., in the U.S. a bit value of "1" may correspond to "restricted to viewers above the age of 12" whereas in Canada a bit value of "1" may correspond to "restricted to viewers above the age of 18"). In some embodiments, only a single copy of the media asset may be maintained by media server 208.

Manifest 210 may be provided to client device 202 (or another client device associated with the user, e.g., client device 202 may be utilized as a second screen to direct the media asset to be presented on another device in a vicinity of the user and/or in a home network of the user) from media server 208 in response to receiving user selection of option 207 to play the media asset. At 212, the streaming application may analyze upcoming frame(s) of a current or next segment. In some embodiments, the streaming application, being executed at least in part at media server 208, may analyze such frames using techniques such as discussed in further detail in connection with FIG. 6 to determine whether such frames contain objectionable content.

At 214, the streaming application may determine whether the upcoming one or more frames (e.g., a subset of frames included in the next segment to be provided to the client device) are flagged as containing objectionable content. Upon determining that such frames are flagged as having objectionable content, the streaming application may compare a parental rating associated with such flagged content to a local parental rating (e.g., set by a user and associated with a user profile of the user on the streaming application).

At 216, upon determining the parental control rating associated with the analyzed frames are incompatible with the local parental control setting (e.g., the local parental control setting requires a "G" rating, and the parental control rating of the analyzed frames indicates the content is suitable only for ages 12 and over), processing may move to 220.

If the streaming application determines (at 214) that the analyzed frames do not contain objectionable content, or (at 216) that the analyzed frames contain objectionable content but nonetheless are compatible with the local parental rating, the streaming application may, at step 218, generate for presentation to the user at client device 202 the analyzed frames in their original form.

At 220, upon determining upcoming frames are flagged as having objectionable content, the streaming application may prompt a user to enter a password, PIN or other authenticator, to enable viewing the objectionable content (e.g., to override the local parental control setting and present the frame as originally constructed). If the streaming application determines that no password has been entered, at 222 the frames at issue may be skipped (or other content may be inserted in place of such frames, as discussed above in connection with 120 of FIG. 1). For example, if the streaming application determines that upcoming frames 6-1000 are objectionable, and does not receive a response to the prompt for password, the streaming application may request the next combination of frames (e.g., starting from frame 1001) for presentation after the skip operation (or after the presentation of placeholder content or supplemental content in place of the objectionable content). In some embodiments, entry of the password may be permitted during such other content (e.g., to cause presentation of the objectionable content instead of the placeholder or supplemental content).

Figure 3:
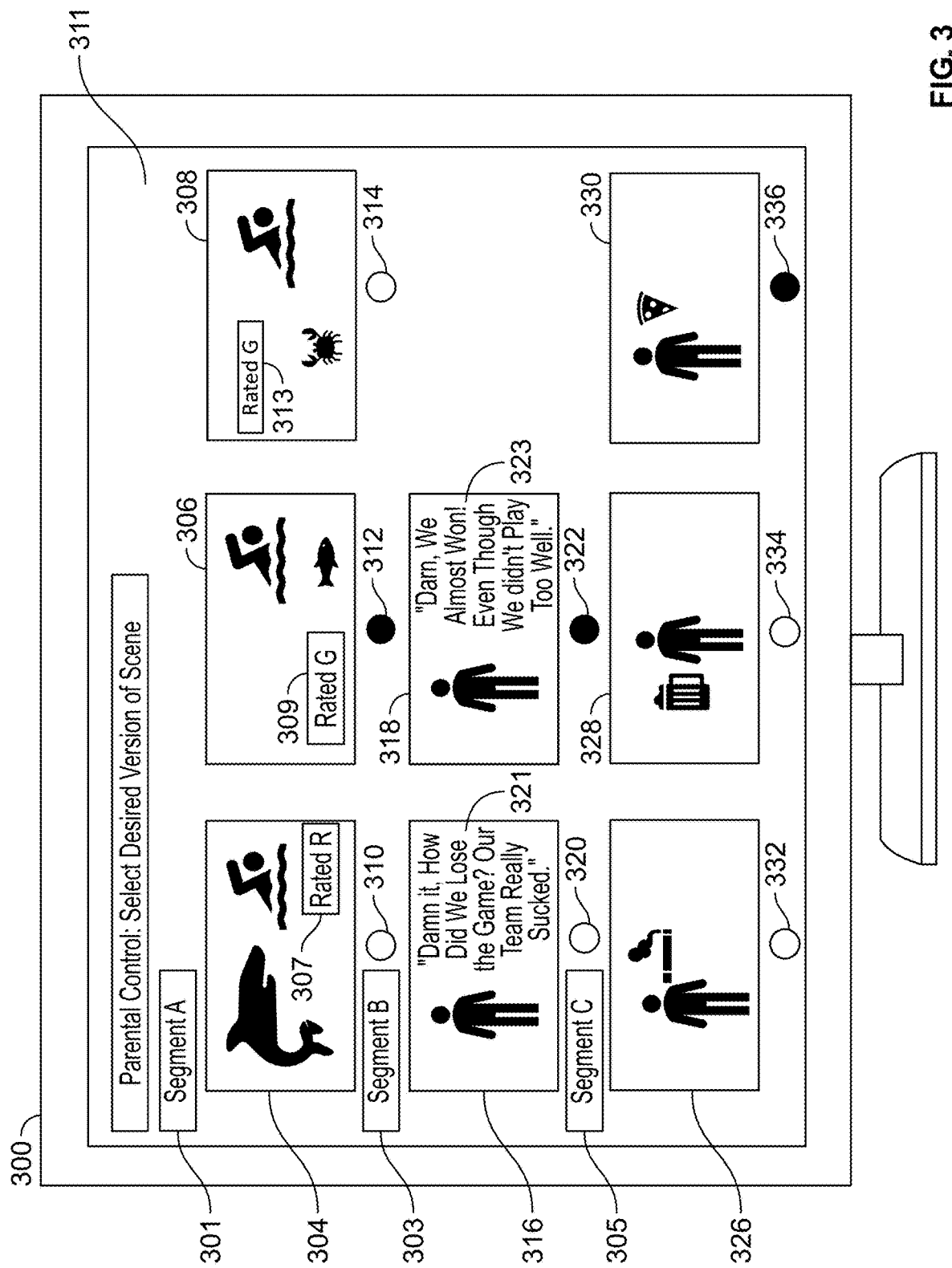
FIG. 3 shows an exemplary user interface for selection of versions of respective segments of a media asset, in accordance with some embodiments of this disclosure.

FIG. 3 shows an exemplary user interface for selection of versions of respective segments of a media asset, in accordance with some embodiments of this disclosure. A streaming application (e.g., implemented at least in part on client device 300, which may correspond to any of computer device 807, mobile device 808, television 810 of FIG. 8, in communication with server 804) may generate for display on GUI 311 a depiction of a portion of versions 304, 306, 308 of segment 301 of a media asset, associated with respective selectable options 310, 312, 314; a portion of versions 316, 318 of segment 303 of the media asset associated with respective selectable options 320, 322; and a portion of versions 326, 328, 330 of segment 305 of the media asset associated with respective selectable options 332, 334, 336.

Each version of a particular segment may depict a variation of such segment (e.g., one or more key frames of the version of the segment including video and/or audio of the segment, screenshots of the segment, a Graphics Interchange Format (GIF) image or other animation related to the segment, a fast-forwarded version of the segment, subtitles 321 and/or 323 of potentially objectionable language of the segment, critical reviews associated with the segment, reactions of friends of the user, on the streaming application or social network, to the segment). In some embodiments, a parental control rating (e.g., 307, 309, 313) associated with a specific version of a segment may be depicted near or adjacent to the associated version.

As shown in FIG. 3, a depicted portion of version 304 of segment 301 may be a frame depicting a person swimming away from a shark, where the shark is about to attack the swimmer (e.g., which may be potentially objectionable content), and such portion of version 304 of segment 301 may additionally or alternatively comprise an additional frame depicting the shark attacking the swimmer. Parental control rating 307 may indicate such portion of version 304 is rated R (i.e., restricted, containing adult material such as graphic violence in this case, in other cases substance abuse, nudity, or mature behavior, and thus not appropriate for viewing by unaccompanied children under 17). In the example of FIG. 3, alternative versions of segment 301 comprise a depiction in which a portion of version 306 substitutes a small fish in place of the shark in version 304, and having a parental control rating 309 of "G" (i.e., suitable for all audiences), may be selected by the user via selectable option 312. The alternative versions of segment 301 may additionally comprise a crab substituted for the shark in version 304, which may be associated with parental control rating 313 of "G". The selectable options may be presented in any suitable form (e.g., radio button, drop down menu, an icon depicting the portion of the respective version, etc.).

In some embodiments, a first user (e.g., a parent) may make selections prior to a time of viewing the media asset with a second user (e.g., a child) to avoid the second user viewing the potentially objectionable scenes during the selection process. GUI 302 of FIG. 3 may alternatively be generated for presentation on another device (e.g., client device 402 of FIG. 4) other than a device on which the media asset is to be presented (e.g., to allow the first user, a parent, to make selections of suitable versions of segments on his or her mobile device, and prevent a second user, a child, from seeing portions of the objectionable content).

Selection of option 322 may be received from the user, where option 322 is associated with a portion of version 318 of segment 303 depicted in GUI 302. Such portion of version 318 may indicate in subtitles 323 a variation of potentially objectionable content as compared to subtitles 321 depicted in portion of version 316 of segment 303. For example, it may be desirable select version 318 since, as indicated in the associated subtitles, certain words which may be considered vulgar or inappropriate (e.g., "Damn," "sucked") may be replaced with more innocuous terms ("Darn") or omitted in version 318.

Additionally or alternatively, selection of option 336 may be received by the streaming application from the user, where option 336 is associated with a portion of version 330 of segment 305 depicted in GUI 302. It may be desirable to select version 332, which depicts a variation of segment 332 in which a person is shown with a slice of pizza, as opposed to versions 326 and 328 of segment 305 depicting a cigarette and an alcoholic beverage, respectively. On the other hand, it may be desirable for a user to select version 326 or version 328 if a first user (e.g., a parent) determines that viewing such a scene may help facilitate a conversation about, or demonstrate to a second user (e.g., a child) negative consequences of, substance abuse. Such aspects provide a flexible approach to selectively streaming content, where a user is provided with sufficient information and/or previews of upcoming scenes to enable the user to thoughtfully tailor which segments are to be shown (e.g., based on other people the user plans to consume the content with or a current mood or preferences of the user).

Figure 4:
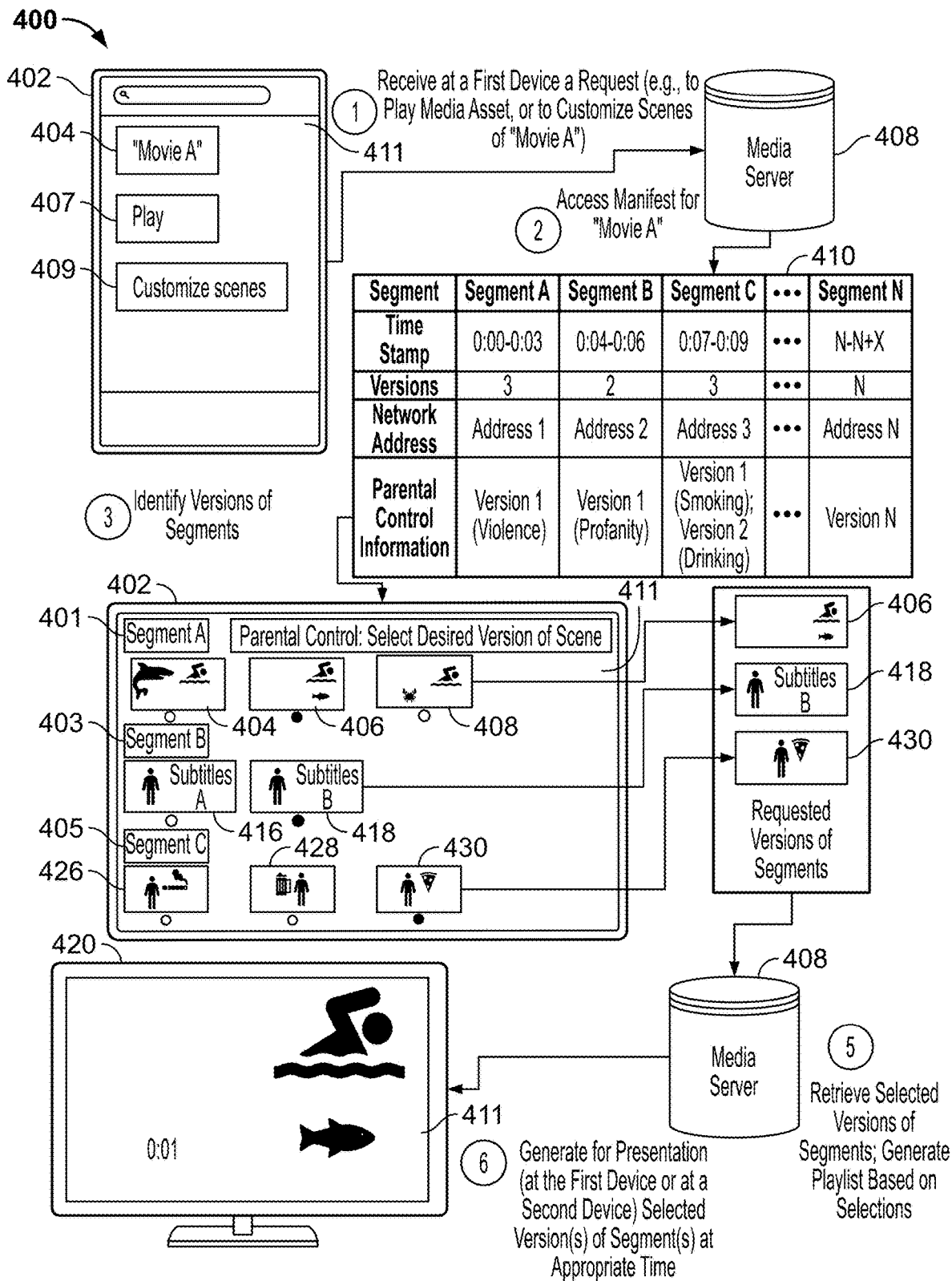
FIG. 4 shows a block diagram for presenting a media asset at a client device in accordance with selection of respective versions of one or more segments of a media asset, in accordance with some embodiments of this disclosure.

In some embodiments, once selections of a particular version for each respective segment potentially containing objectionable content is received by the streaming application from a user, indications of such selections may be stored (e.g., in connection with a user profile associated with the streaming application, at media server 408 of FIG. 4 and/or client device 402, 420 of FIG. 4) for future use. For example, multiple playlists associated with a media asset may be stored, and may be accessible as appropriate depending on one or more users that are to view the content (e.g., a playlist with "G" versions of segments selected for viewing with children; a playlist with "R" versions of segments selected for an adult to view with friends or older family members, etc.). In some embodiments, GUI 411 may include, when a user navigates to the media asset, selectable options to choose which playlist the user would like to watch. In some embodiments, once selections have been made by a user of particular versions of segments, a request to play the media assets associated with the selections received by the streaming application may cause the media asset to be played based on such selections, without presenting the selectable options (e.g., since the user has already made certain selections).

In some embodiments, the streaming application may generate for presentation variations of a particular scene which exclude content that, while not determined by the streaming application to be inappropriate for certain age groups, nonetheless may be undesirable for some users. For example, if the streaming application determines that a particular portion of a media asset is related to politics, the streaming application may generate for presentation one or more indicators that a certain version of a segment has political content, and the user may select a different version of the segment to avoid hearing about politics. In some embodiments, the user may specify such categories for the streaming application to monitor (e.g., politics, celebrity gossip, etc.) as undesirable to the user. The neural network 600 of FIG. 6 may be trained to recognize the specified topics, and/or image processing and audio processing techniques may be employed to monitor the specified topics.

In some embodiments, the streaming application may allow for creation of multiple playlists for a media asset. For example, for a particular media asset, a first playlist may be suitable for a first user (e.g., a parent) to consume the media asset with his or her children (e.g., replacing objectionable scenes with more innocuous versions of the scenes); a second playlist may be suitable for the first user to consume with his or her spouse (e.g., including romantic scenes, but replacing scenes with lewd humor with another version); and a third playlist may be created that is suitable for the first user to consume with his or her friends (e.g., including the scenes having lewd humor but different versions of the romantic scenes). Such playlists may be stored for future use by the user and/or for sharing with other users (e.g., via the streaming application or via other applications, such as social media, or via email or other multimedia messaging). In some embodiments, the streaming application may maintain a library of playlists for future access (e.g., enabling a user to play a movie the same way as his or her friends). In some embodiments, playlists having a higher parental rating than a predefined local parental control setting may not be accessible without entering a password or PIN related to the local parental control setting.

In some embodiments, predefined templates of selected versions of segments of a media asset may be provided by the streaming application. Such templates may be useful where a media asset has many objectionable segments (and thus many versions such segment to choose from). To provide the user with a quick way to select versions of scenes, the streaming application may provide predefined templates (e.g., "Kids," "Parents," "Teenagers," "Friends," "Grandparents," etc.) which have pre-selected versions of each scene suitable for the selected template. The streaming application may determine which version to select based on metadata associated with a template and the versions of segments (e.g., the "Kids" template should not select any version above "PG"). The streaming application may allow the user to modify the pre-selected versions of segments based on the template prior to playing the media asset.

FIG. 4 shows a block diagram 400 for presenting a media asset at a client device in accordance with selection of respective versions of one or more segments of a media asset, in accordance with some embodiments of this disclosure. Client device 402 (e.g., by way of a streaming application running at least in part on client device 402) may generate for display GUI 411 which may comprise media listing 404 associated with a media asset (e.g., "Movie A"), option 407 to cause presentation of the media asset, and option 409 ("Customize scenes"). Media server 408 may retrieve manifest 410 for such media asset, e.g., in response to the streaming application receiving user selection of option 407 or option 409.

Manifest 410 may specify information associated with one or more segments of the requested media asset, e.g., time stamp or time duration within the presentation time of the media asset that the segment is shown, the number of alternate versions of variations are associated with the particular segment, a network address from which the one or more versions of the particular segment may be retrieved, parental control information associated with the particular segment, one or more network addresses where audio and/or video information of a portion of respective versions of a segment may be retrieved, etc.

Client device 402 may generate for display, based on received manifest 410, GUI 411 comprising multiple versions of portions of each of segment 401, 403 and 405, respectively (e.g., as shown in FIG. 3) simultaneously with selectable options respectively associated with such versions. For example, an identifier for segment 401 may be generated for presentation by the streaming application alongside portions of versions 404, 406, 408 and respective associated selectable identifiers; an identifier for segment 403 may be generated for presentation by the streaming application alongside portions of versions 416, 418 and respective associated selectable identifiers; and an identifier for segment 405 may be generated for presentation by the streaming application alongside portions of versions 426, 428, 430 and respective associated selectable identifiers.

Based on the manifest, the streaming application may depict parental control information (e.g., indicating a rating, such as "R", associated with a portion, indicating terms or phrases such as "violence," "nudity," etc.) to assist a user with determining the suitability of the version of the segment for particular audiences. In some embodiments, one or more of the portions of the respective versions may depict key frames of at least a portion of the variation of the segment (e.g., including audio and/or video tracks associated with the key frames), which may enable a user to ascertain the type of objectionable content associated with the specific version. In some embodiments, the streaming application may generate for presentation subtitle information associated with particular versions of segments, and/or other content (e.g., animations or GIFs associated with respective versions of a segment, fast-forwarded versions of respective versions of a segment, critical reviews or ratings of specific versions of a segment, etc.).

The parental control information specified in the manifest may be determined, e.g., by the streaming application, based on any of a variety of techniques. In some embodiments, a neural network model may be employed, as discussed in more detail in connection with FIG. 6. Additionally or alternatively, versions of content may be supplied to media server 408 having been labeled (e.g., by human reviewers of a content provider, such as media content source 802 of FIG. 8, or film ratings organizations) with parental control information. In some embodiments, the streaming application may employ image and/or audio processing techniques (e.g., speech-to-text processing of segments, extraction and analysis of keywords included in audio and/or subtitles) to analyze respective versions of each segment, extract and/or identify key features of each version, and compare such key features to a database storing a table associating key features with parental control ratings.

As shown in FIG. 4, the streaming application may receive selection of version 406 of segment 401, version 418 of segment 403, and version 430 of segment 405, and such s such selections may be transmitted from client device 402 to media server 408. Media server 408 may generate a playlist based on such selections. In some embodiments, such playlists may be stored (e.g., at server 408 and/or at a client device) for prospective use by the user, e.g., the streaming application may store a playlist suitable for adults based on user selections, and a playlist suitable for all ages based on user selections. In some embodiments, the streaming application may prompt a user for entry of a password (e.g., associated with a parental control setting) before permitting the playlist suitable for adults to be played.

Media server 408 may transmit the selected playlist to client device 420 (e.g., smart television 810 of FIG. 8), which may generate for presentation the selected version of a particular segment at the appropriate time (e.g., version 406 of segment 401 may be generated for presentation at 0:01 within the presentation of the media asset corresponding to the time stamp associated with segment 401). The client device may be a different device (or alternatively may be the same device) as client device 402, from which media server 408 receives selections of respective versions of segments. Each of the selected versions of respective segments may be generated for presentation at the appropriate time during playback of the media asset (e.g., at 0:04 of the presentation of the media asset, version 418 of segment 403 may be transmitted to client device 420 and generated for presentation, and at 0:07 of the presentation of the media asset, version 430 of segment 405 may be transmitted to client device 420 and generated for presentation).

In some embodiments, a first device (e.g., a mobile device such as client device 402) associated with a first user (e.g., a parent) may receive prompts from media server 408 to select a version of a particular segment on the fly (e.g., during presentation of a media asset). For example, if the streaming application determines that an upcoming segment comprises potentially objectionable content, such first device may receive portions of respective versions of the upcoming segment and request a selected version from media server 408, and such requested version may be transmitted to client 420 (or client device 402) for presentation to the user. For example, such notifications may include indications that a rated "R" segment is upcoming. In some embodiments, if the media server does not receive a response concerning versions of the segment, the streaming application may by default select a "G" rated version (e.g., appropriate for all ages) or a version that comports with a local parental rating.

Figure 5:
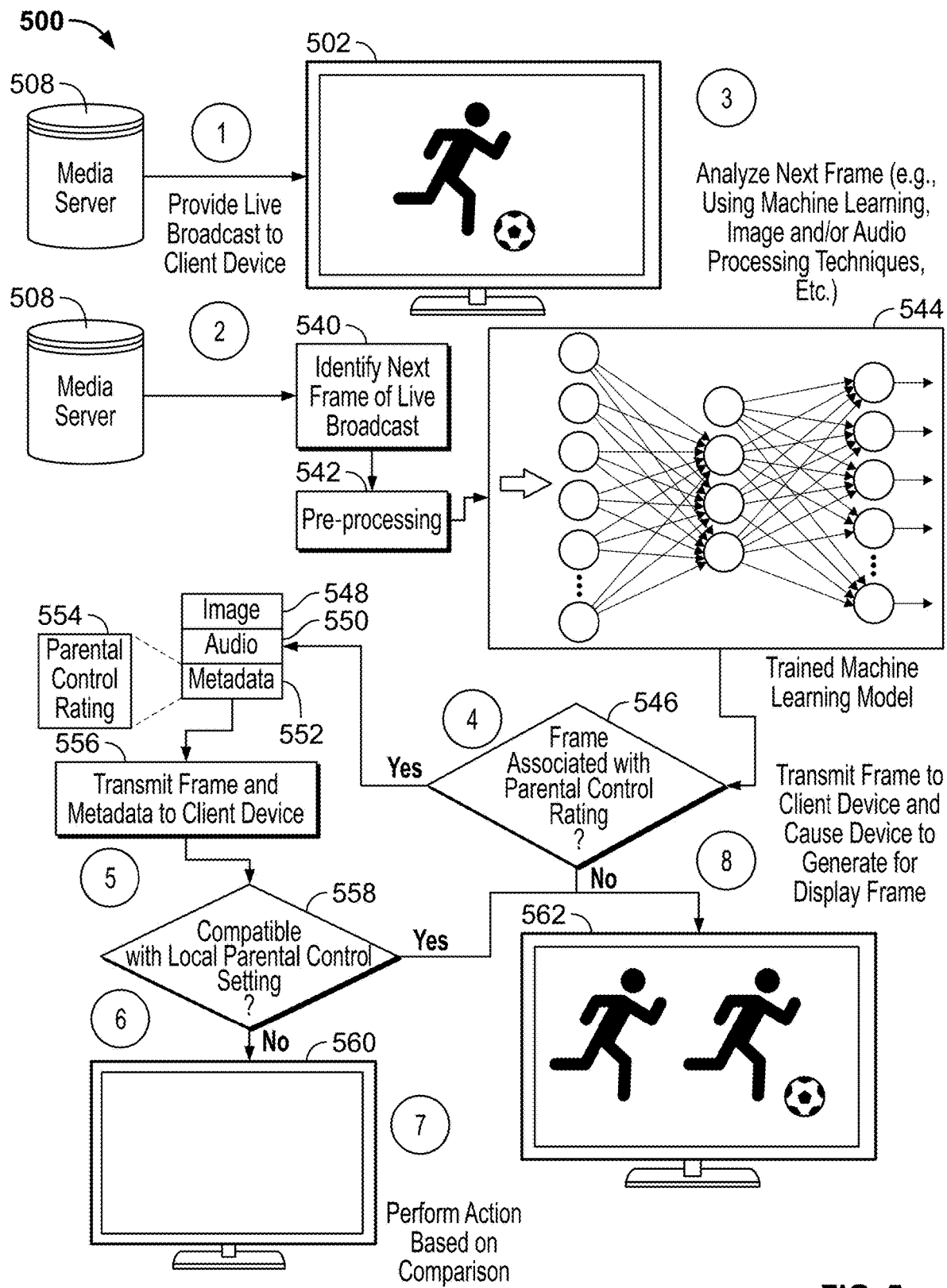
FIG. 5 shows a block diagram for monitoring frames of a live broadcast of a media asset based on parental control ratings, in accordance with some embodiments of this disclosure.

FIG. 5 shows a block diagram 500 for monitoring frames of a live broadcast of a media asset based on parental control ratings, in accordance with some embodiments of this disclosure. Media server 508 may provide a live broadcast of a media asset (e.g., a live broadcast of a soccer match) to client device 502, in response to receiving a request to access the media asset. At 540, a streaming application (e.g., running at least in part on media server 508) may identify the next (one or more) frames to be presented in the requested live broadcast. The streaming application may perform the identification of the next frame throughout the broadcast of the media asset, as the media asset is being consumed by the user.

Figure 6:
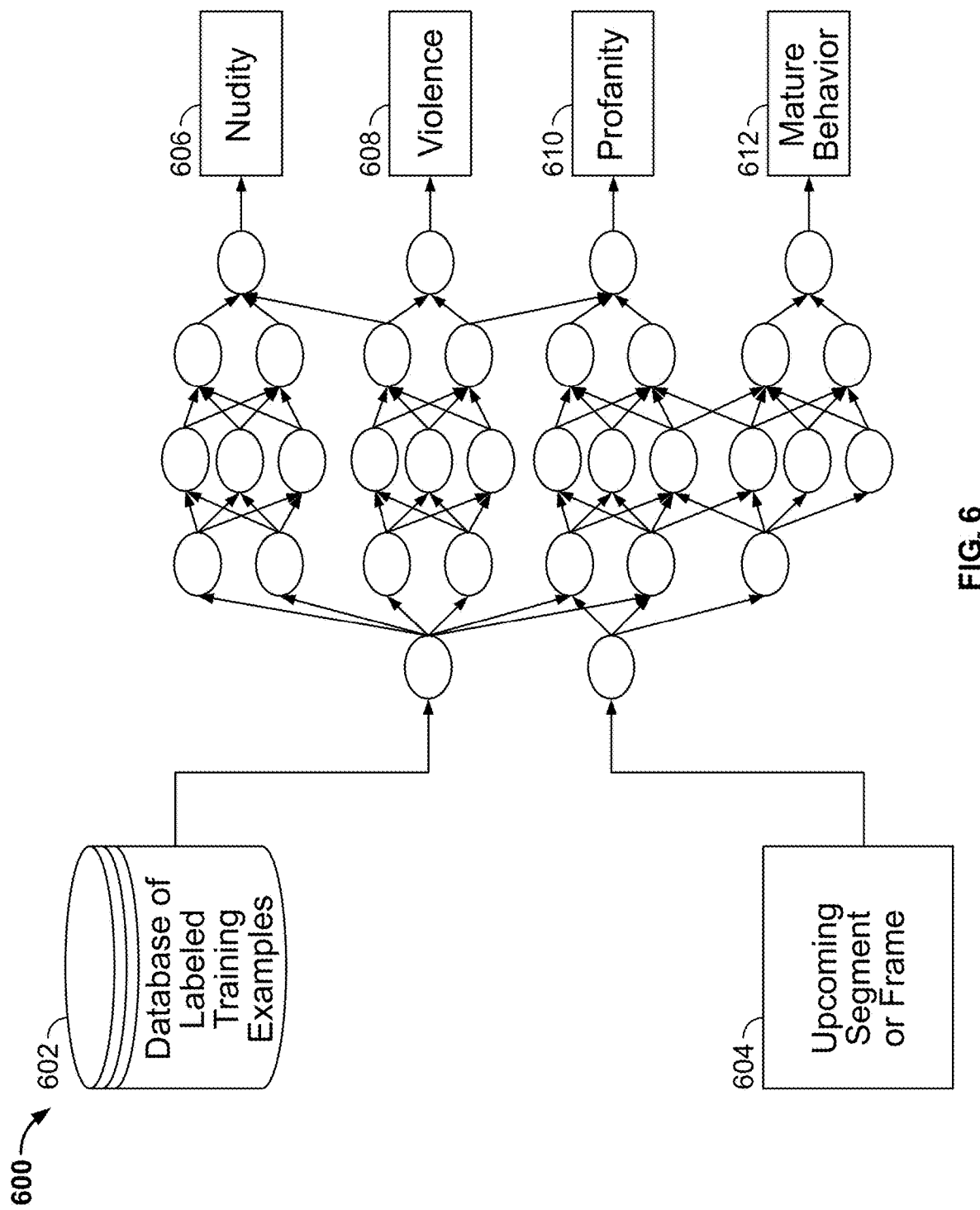
FIG. 6 shows an example of a neural network machine learning model, in accordance with some embodiments of this disclosure.

At 542, the streaming application may perform pre-processing of the upcoming frame, in order to place the data associated with the frame in a format appropriate for input to a machine learning model (e.g., neural network 600 of FIG. 6). For example, such pre-processing may convert raw image or audio data included in the frame to a vector format. Alternatively, pre-processing may be performed at the machine learning model itself or may not be performed.

At 544, the upcoming frame may be analyzed with a trained machine learning model (e.g., a neural network, discussed in more detail in FIG. 6). For example, pre-processed frame data may be input to the machine learning model, which may output a determination of whether the frame contains potentially objectionable content and a classification of such objectionable content. Additionally or alternatively, the streaming application may employ image and/or audio processing techniques to analyze the upcoming frame, extract and/or identify key features of the frame, and compare such key features to a database storing a table associating key features with parental control ratings, to determine whether the frame contains objectionable content. In some embodiments, the frame may contain metadata indicative of a parental control rating associated with the frame.

At 546, the streaming application may determine (e.g., based on the output of the machine learning model at 544, and/or other processing performed at 544) whether the upcoming frame is associated with a parental control rating (e.g., whether the upcoming frame comprises potentially objectionable content). Upon determining the upcoming frame comprises potentially objectionable content, the streaming application may associate metadata 552 comprising parental control rating 554 with the frame (which may also include image and/or video data 548 and audio data 550) or insert the parental control rating in metadata appended to the frame. For example, the parental control rating 554 may be a type of objectionable content depicted (e.g., nudity, profane language, violence or other mature behavior) and/or another type of rating (e.g., "R", "PG-13", "G", or "Not suitable for ages 12 and under"). At 556, the streaming application may transmit to client device 502 the upcoming frame and the metadata associated with the frame that is indicative of the parental control rating.

At 558, the transmittal of the metadata indicative of the parental control rating from media server 508 may cause client device 502 to determine, based on the received metadata, whether such parental control rating for the frame is compatible with a local parental control setting (e.g., at client device 502 and/or associated with a profile of the user on the streaming application or client device 502). For example, the objectionable content may correspond to unexpected events occurring during the soccer match (e.g., a player, coach, fan or commentator uttering profane language which may be audible during the live broadcast, a fan running on the field wearing no clothing, etc.).

If the local parental control setting indicates, e.g., that content inappropriate for ages 12 and under should be restricted, and the received parental control rating indicates the upcoming frame contains nudity and/or extreme violence, client device 502 may determine to perform a suitable action. For example, as discussed in further detail in connection with FIG. 12, the action may correspond to displaying one or more frames 560 of a blank or dark screen in place of the objectionable frames, fade out from the last acceptable frame and fade in to the next appropriate frame, skipping the objectionable frames, replacing the objectionable content with one or more predetermined frames (e.g., statistics of the ongoing soccer match, highlights of the soccer match or related sporting events, advertisements, other supplemental or interactive content, etc.), automatically changing the channel the media asset is associated with for a predetermined period of time to avoid displaying the objectionable content, etc. In some embodiments, the skipped or replaced one or more frames may be stored locally or transmitted to a secondary device (e.g., a mobile phone of a user) to allow for later viewing of the objectionable content.

If the streaming application determines at 546 that the frame is not associated with a parental control rating (e.g., does not, or is unlikely to, contain objectionable content), or determines at 558 that the received parental control rating is compatible with the local parental control setting, the media server 508 may cause client device 502 to generate for display such frame. In some embodiments, the streaming application may associate metadata with the frame, or insert an indication into metadata associated with the frame, to indicate that the frame does not contain objectionable content (and thus can be played by client device 562 regardless of a local parental control setting). For example, the streaming application may determine that one or more frames depicted at client device 562 are simply a subsequent play in the soccer match, and does not implicate a restrictive parental control rating.

FIG. 6 shows a neural network machine learning model 600, which may be employed in some embodiments of this disclosure. The neural network may be trained with labeled training examples 602 (e.g., media assets having been previously provided with a parental control rating by reviewers). Such labeled training examples 602 may be stored in a database (e.g., database 805 of FIG. 8). Based on such training, the neural network model may identify certain features that are predictive of a parental control rating (e.g., certain words correlated with profanity, certain objects, actions or images correlated with violence or mature behavior, certain images correlated with nudity, etc.), and the trained neural network model may apply such learned inferences and patterns to upcoming segment or frame 604, to determine whether such upcoming segment or frame 604 likely contains objectionable content.

The streaming application may pre-process the upcoming one or more segments or frames 604 to generate one or more vectors indicative of key features of the one or more segments or frames 604, and such one or more vectors may be input into trained neural network 600 which processes the frame or segment based on the one or more input vectors and outputs a parental control rating (e.g., nudity 606, violence 608, profanity 610, mature behavior 612). In some embodiments, such output may be used by the streaming application to assign a particular rating (e.g., "R", "PG-13", "G") to upcoming segments or frames 604.

In some embodiments, the machine learning algorithm may be trained with a training set of example frames and/or segments that are commonly skipped (e.g., fast-forwarded through, or during which a request to access a different media asset was made) or were caused to be replaced with other content by a large number of users (e.g., having similar local parental control settings). If the machine learning model determines that input frames or segments have a high degree of similarity with such skipped or replaced content, the model may classify the input segment or frame as also being skippable or replaceable, and assign a parental control rating to such input frame or segment that is similar to a training example having similar characteristics. Neural networks are discussed in more detail in connection with U.S. Patent Application Publication No. US 2017/0161772 A1 to Xu et al., published Jun. 8, 2017, and US 2020/0183773 A1 to Brehm, published Jun. 11, 2020, each of which is hereby incorporated by reference herein in its entirety.

Figure 7:
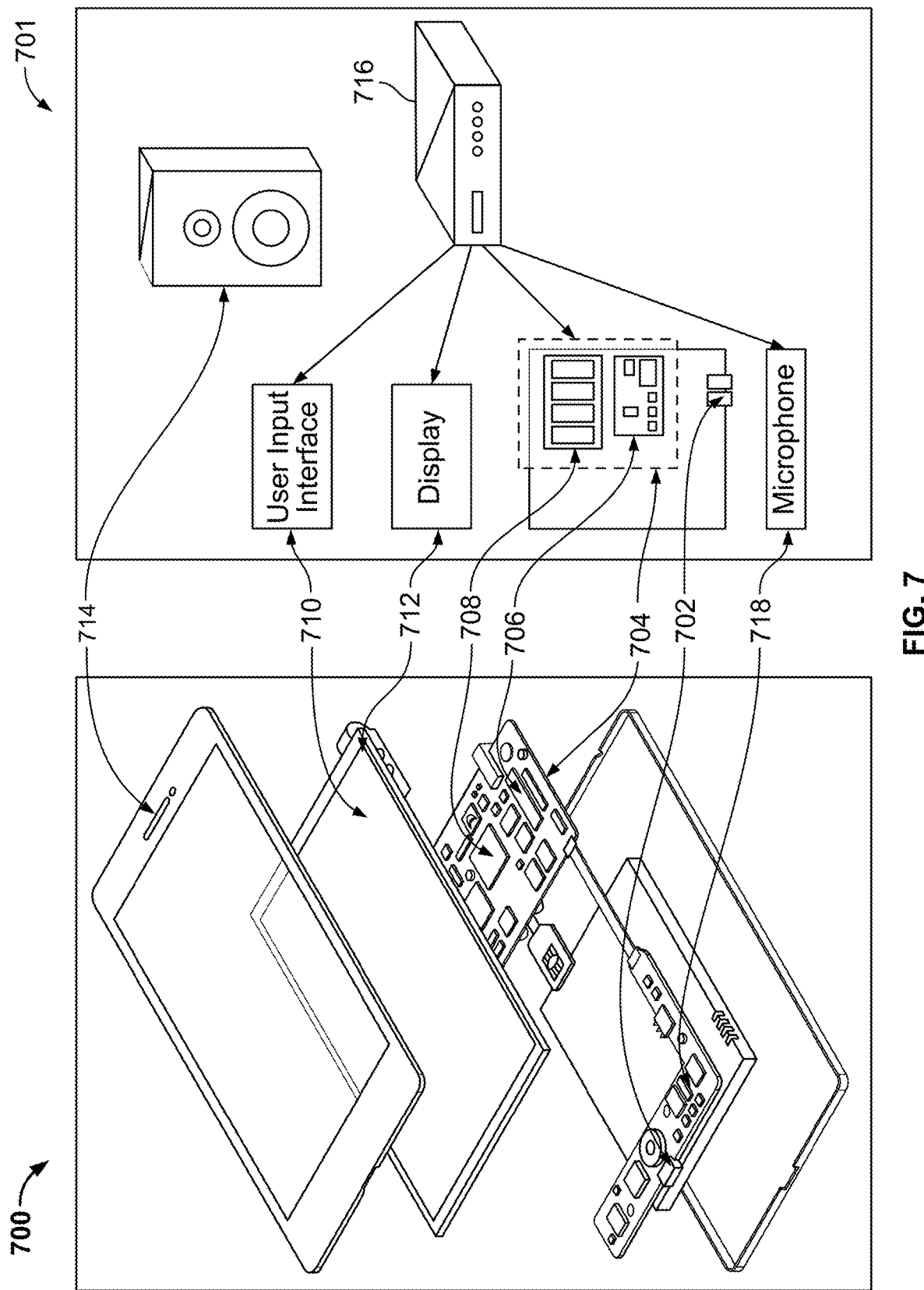
FIG. 7 shows a block diagram of an illustrative streaming device, in accordance with some embodiments of this disclosure.
Figure 8:
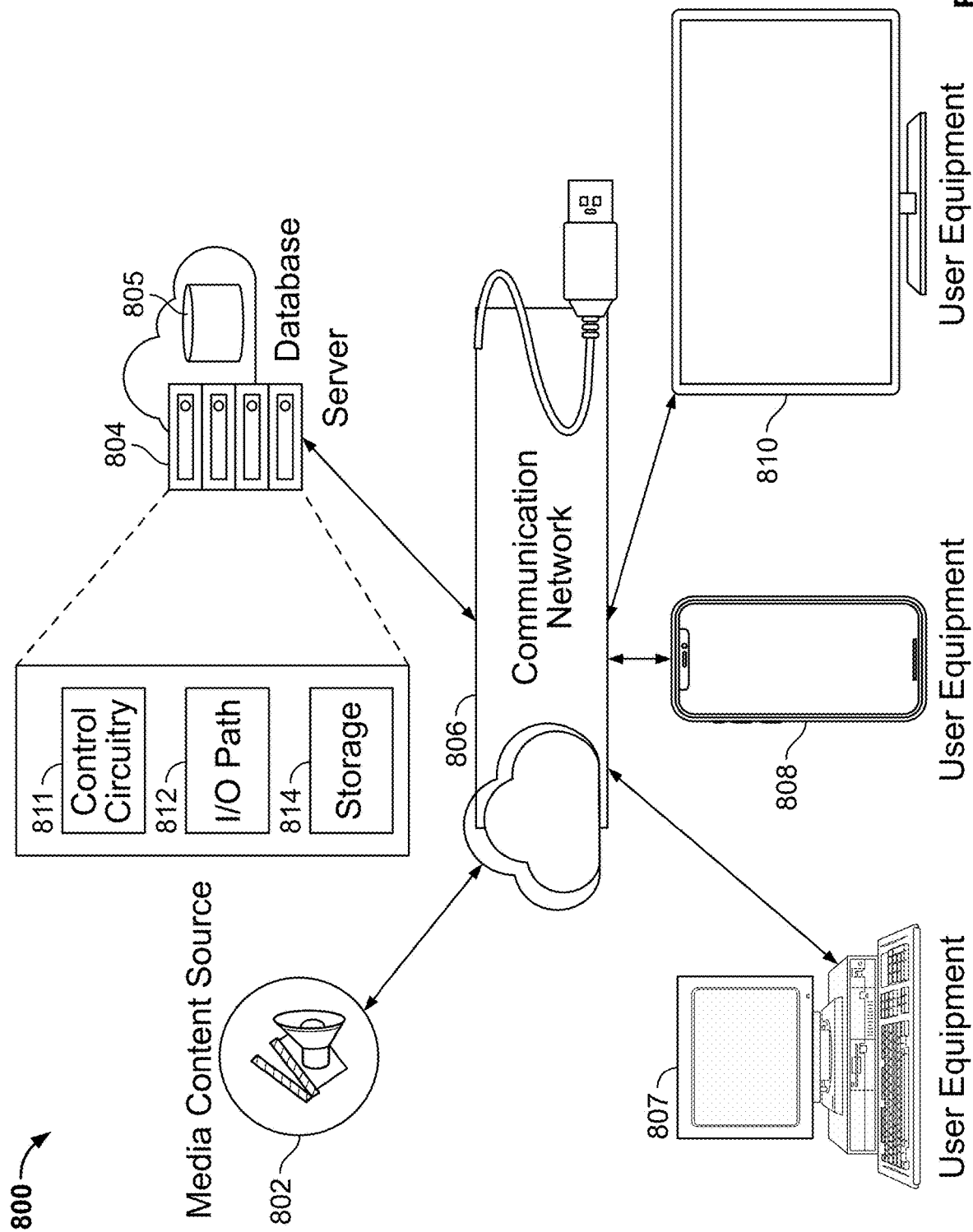
FIG. 8 shows a block diagram of an illustrative streaming system, in accordance with some embodiments of this disclosure.

FIGS. 7-8 describe exemplary devices, systems, servers, and related hardware for selectively streaming content based on parental control ratings, in accordance with some embodiments of the present disclosure. FIG. 7 shows generalized embodiments of illustrative user equipment devices 700 and 701. For example, user equipment device 700 may be a smartphone device. In another example, user equipment system 701 may be a user television equipment system (e.g., smart television 300 of FIG. 3). User television equipment system 701 may include set-top box 716. Set-top box 716 may be communicatively connected to microphone 718, speaker 714, and display 712. In some embodiments, microphone 718 may receive voice commands for the streaming application. In some embodiments, display 712 may be a television display or a computer display. In some embodiments, set-top box 716 may be communicatively connected to user input interface 710. In some embodiments, user input interface 710 may be a remote control device. Set-top box 716 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of user equipment devices are discussed below in connection with FIG. 8. Each one of user equipment device 700 and user equipment system 701 may receive content and data via input/output ("I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702, which may comprise I/O circuitry. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a streaming application stored in memory (i.e., storage 708). Specifically, control circuitry 704 may be instructed by the streaming application to perform the functions discussed above and below. In some implementations, any action performed by control circuitry 704 may be based on instructions received from the streaming application.

In client/server-based embodiments, control circuitry 704 may include communications circuitry suitable for communicating with a streaming application server or other networks or servers. The instructions for carrying out the above mentioned functionality may be stored on a server (which is described in more detail in connection with FIG. 8. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as streaming application data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of user equipment 700. Circuitry 704 may also include digital-to-analog converter circuitry and analog-to-digital converter circuitry for converting between digital and analog signals. The tuning and encoding circuitry may be used by user equipment device 700, 701 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment device 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of each one of user equipment device 700 and user equipment system 701. For example, display 712 may be a touchscreen or touch-sensitive display. In such circumstances, user input interface 710 may be integrated with or combined with display 712. Display 712 may be one or more of a monitor, a television, a display for a mobile device, or any other type of display. A video card or graphics card may generate the output to display 712. The video card may be any processing circuitry described above in relation to control circuitry 704. The video card may be integrated with the control circuitry 704. Speakers 714 may be provided as integrated with other elements of each one of user equipment device 700 and user equipment system 701 or may be stand-alone units. The audio component of videos and other content displayed on display 712 may be played through the speakers 714. In some embodiments, the audio may be distributed to a receiver (not shown), which processes and outputs the audio via speakers 714.

The streaming application may be implemented using any suitable architecture. For example, it may be a stand-alone application wholly-implemented on each one of user equipment device 700 and user equipment system 701. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to rearrange the segments as discussed. Based on the processed instructions, control circuitry 704 may determine what action to perform when input is received from user input interface 710. For example, movement of a cursor on a display up/down may be indicated by the processed instructions when user input interface 710 indicates that an up/down button was selected.

In some embodiments, the streaming application is a client/server-based application. Data for use by a thick or thin client implemented on each one of user equipment device 700 and user equipment system 701 is retrieved on-demand by issuing requests to a server remote to each one of user equipment device 700 and user equipment system 701. In one example of a client/server-based guidance application, control circuitry 704 runs a web browser that interprets web pages provided by a remote server. For example, the remote server may store the instructions for the application in a storage device. The remote server may process the stored instructions using circuitry (e.g., control circuitry 704) and to selectively replay interrupted segments of media content that are important for understanding a storyline of the media content as discussed.

In some embodiments, the streaming application may be downloaded and interpreted or otherwise run by an interpreter or virtual machine (run by control circuitry 704). In some embodiments, the streaming application may be encoded in the ETV Binary Interchange Format (EBIF), received by the control circuitry 704 as part of a suitable feed, and interpreted by a user agent running on control circuitry 704. For example, the streaming application may be an EBIF application. In some embodiments, the streaming application may be defined by a series of JAVA-based files that are received and run by a local virtual machine or other suitable middleware executed by control circuitry 704. In some of such embodiments (e.g., those employing MPEG-2 or other digital media encoding schemes), the streaming application may be, for example, encoded and transmitted in an MPEG-2 object carousel with the MPEG audio and video packets of a program.

FIG. 8 is a diagram of an illustrative streaming system, in accordance with some embodiments of the disclosure. User equipment devices 807, 808, 810 (e.g., a personal computer, mobile device 402 of FIG. 4, smart television 420 of FIG. 4) may be coupled to communication network 806. Communication network 806 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 806) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 8 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via communication network 806.

System 800 includes a media content source 802 and a server 804, which may comprise or be associated with database 805. Communications with media content source 802 and server 804 may be exchanged over one or more communications paths but are shown as a single path in FIG. 8 to avoid overcomplicating the drawing. In addition, there may be more than one of each of media content source 802 and server 804, but only one of each is shown in FIG. 8 to avoid overcomplicating the drawing. If desired, media content source 802 and server 804 may be integrated as one source device.

In some embodiments, server 804 may include control circuitry 811 and a storage 814 (e.g., RAM, ROM, Hard Disk, Removable Disk, etc.). Server 804 may also include an input/output path 812. I/O path 812 may provide device information, or other data, over a local area network (LAN) or wide area network (WAN), and/or other content and data to the control circuitry 811, which includes processing circuitry, and storage 814. The control circuitry 811 may be used to send and receive commands, requests, and other suitable data using I/O path 812, which may comprise I/O circuitry. I/O path 812 may connect control circuitry 704 (and specifically processing circuitry) to one or more communications paths.

Control circuitry 811 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 811 executes instructions for an emulation system application stored in memory (e.g., the storage 814). Memory may be an electronic storage device provided as storage 814 that is part of control circuitry 811.

Server 804 may retrieve guidance data from media content source 802, process the data as will be described in detail below, and forward the data to \ user equipment devices 808 and 810. Media content source 802 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 802 may be the originator of content (e.g., a television broadcaster, a Webcast provider, etc.) or may not be the originator of content (e.g., an on-demand content provider, an Internet provider of content of broadcast programs for downloading, etc.). Media content source 802 may include cable sources, satellite providers, on-demand providers, Internet providers, over-the-top content providers, or other providers of content. Media content source 802 may also include a remote media server used to store different types of content (including video content selected by a user), in a location remote from any of the client devices. Media content source 802 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 804), which may be located centrally or at distributed locations, that provide cloud-based services to various types of users and devices connected via a network such as the Internet via communication network 806. In such embodiments, user equipment devices may operate in a peer-to-peer manner without communicating with a central server.

Figure 9:
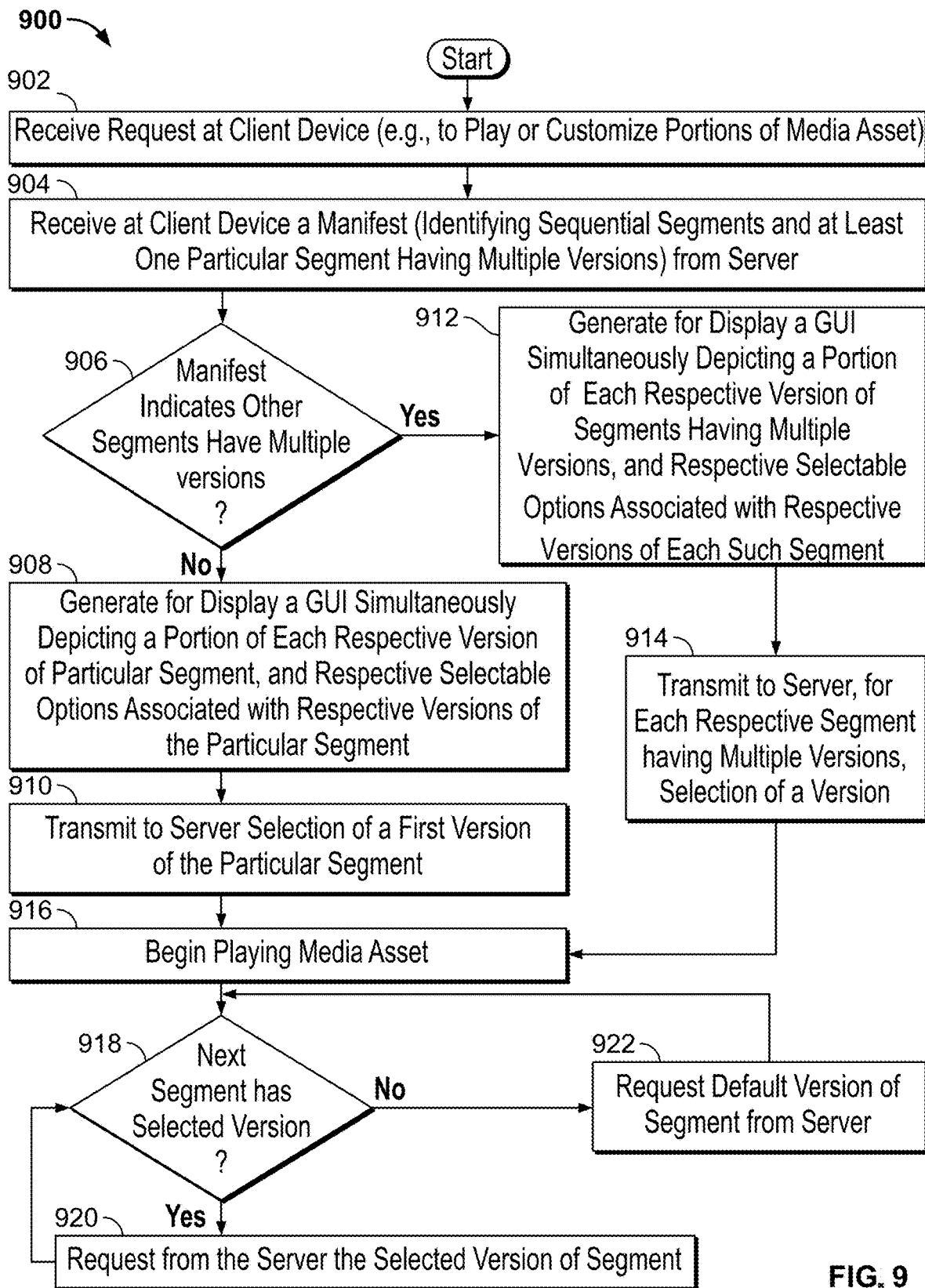
FIG. 9 is a flowchart of a detailed illustrative process for presenting a media asset at a client device in accordance with selection of respective versions of one or more segments of a media asset, in accordance with some embodiments of this disclosure.

FIG. 9 is a flowchart of a detailed illustrative process 900 for presenting a media asset at a client device in accordance with selection of respective versions of one or more segments of a media asset, in accordance with some embodiments of this disclosure. In various embodiments, the individual steps of process 900 may be implemented by one or more components of the devices and systems of FIGS. 7-8. Although the present disclosure may describe certain steps of process 900 (and of other processes described herein) as being implemented by certain components of the devices and systems of FIGS. 7-8, this is for purposes of illustration only, and it should be understood that other components of the devices and systems of FIGS. 7-8 may implement those steps instead. For example, the steps of process 900 may be executed by server 804 and/or by user equipment device 807, 808, and/or 810 to selectively streaming content based on parental control ratings.

At 902, input/output circuitry (e.g., I/O path 702) of a client device (e.g., client device 402 of FIG. 4) may receive a request to play or customize portions of a media asset (e.g., selection of option 407 or 409 included in GUI 411 associated with media listing 404 of a "Movie A" of FIG. 4).

At 904, in response to such request, I/O circuitry of the client device may receive a manifest (e.g., manifest 410 of FIG. 4) from a server (e.g., media server 408 of FIG. 4). The manifest may identify sequential segments (e.g., segments 401, 403, 405 of FIG. 4) of the media asset associated with the request, and identify at least one particular segment having multiple versions (e.g., versions 404, 406, 408 of segment 401; versions 416, 418 of segment 403; versions 426, 428, 430 of segment 405 of FIG. 4).

At 906, control circuitry (e.g., control circuitry 704 of device 700 of FIG. 7 and/or control circuitry 811 of server 804 of FIG. 8) may determine whether the manifest indicates that multiple segments have respective multiple versions.

At 908, if only one segment has multiple versions, control circuitry (e.g., of device 300 of FIG. 3) may generate for display a GUI (e.g., GUI 411 of FIG. 4) simultaneously depicting a portion of each respective version of the particular segment (e.g., portions of versions 304, 306, 308 of FIG. 3), and respective selectable options (e.g., options 310, 312, 314 of segment 301 of FIG. 3) associated with the respective versions of the particular segment. In some embodiments, control circuitry (e.g., of device 300 of FIG. 3) may generate for display parental control information (e.g., parental control information 307 of FIG. 3) indicative of objectionable content in the version, and/or subtitle information (e.g., subtitle information 321 of FIG. 3) indicative of objectionable content in the associated version (e.g., subtitle information 321 of version 316 of FIG. 3).

At 910, control circuitry (e.g., of device 402 of FIG. 4) may transmit to a server (e.g. media server 408 of FIG. 4) selection of a first version of the particular segment (e.g., version 406 of segment 401 of FIG. 4). For example, it may be desirable for a first user (e.g., a parent) to select a version of a scene that is not violent (e.g., version 406 of FIG. 4 as compared to version 404 of FIG. 4) when viewing the media asset with a second user (e.g., a young child).

At 912, if multiple segments have multiple respective versions, control circuitry (e.g., of device 300 of FIG. 3) may generate for display a GUI (e.g., GUI 411 of FIG. 4) simultaneously depicting a portion of each respective version of segments having multiple versions (e.g., portions of versions 304, 306, 308 of segment 301 of FIG. 3; portions of versions 316, 318 of segment 303 of FIG. 3; portions of versions 326, 328, 330 of segment 305 of FIG. 3) and respective selectable options (e.g., options 310, 312, 314 of FIG. 3; options 320, 322 of FIG. 3; options 332, 334, 336 of FIG. 3) associated with the respective versions of each such segment.

At 914, control circuitry (e.g., of device 402 of FIG. 4) may transmit to a server (e.g., media server 408 of FIG. 4) for each respective segment (e.g., segments 401, 403, 405 of FIG. 4) having multiple versions, selection of a version of the particular segment (e.g., selected versions 406, 418, 430 of segments 401, 403, 405, respectively, of FIG. 4).

At 916, control circuitry (e.g., client device 402 or client device 420 of FIG. 4) may begin playing the media asset (e.g., "Movie A" associated with listing 404 of FIG. 4), such as in response to receiving a request to play the media asset (e.g., option 407) or after receiving and transmitting to the server (e.g., media server 408) each selected version of the respective segments of the media asset. The playing of the media asset may be performed in accordance with the received selections (e.g., selected versions 406, 418, 430 of segments 401, 403, 405 may be received by the client device at the appropriate time corresponding to the time stamp of the segment within the presentation of the media asset).

At 918, control circuitry (e.g., client device 402 or client device 420 of FIG. 4) may determine, while playing the media asset (e.g., "Movie A" associated with listing 404 of FIG. 4), whether the next segment has a corresponding selected version (e.g., version 406 of segment 401 of FIG. 4). If the control circuitry determines the next segment does not have a selected version (e.g., the next segment does not have multiple versions, or the user did not select a preference of a version) the control circuitry at 922 may request a default version of the segment from the server (e.g., in accordance with local parental control settings).

At 920, control circuitry (e.g., client device 402 or client device 420 of FIG. 4) may request from the server (e.g., media server 408 of FIG. 4) the selected version of the segment (e.g., version 406 of segment 401 of FIG. 4). Processing may then return to 918 to determine whether the next segment, after version 406 of segment 401 of FIG. 4, has an associated selected version of such next segment.

Figure 10:
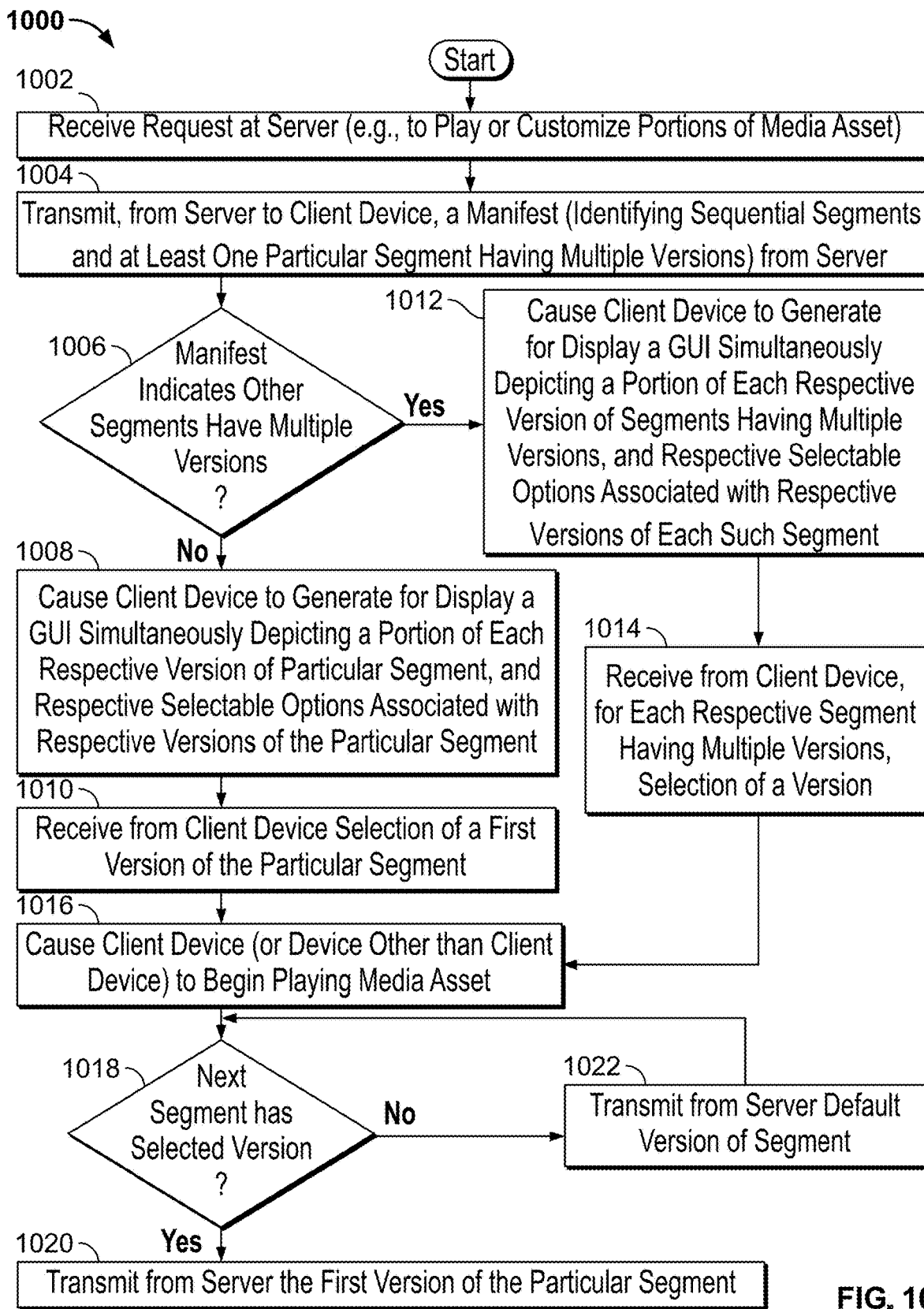
FIG. 10 is a flowchart of a detailed illustrative process for transmitting selected respective versions of one or more segments of a media asset from a server to a client device, in accordance with some embodiments of this disclosure.

FIG. 10 is a flowchart of a detailed illustrative process 1000 for transmitting selected respective versions of one or more segments of a media asset from a server to a client device, in accordance with some embodiments of this disclosure. In various embodiments, the individual steps of process 1000 may be implemented by one or more components of the devices and systems of FIGS. 7-8. Although the present disclosure may describe certain steps of process 1000 (and of other processes described herein) as being implemented by certain components of the devices and systems of FIGS. 7-8, this is for purposes of illustration only, and it should be understood that other components of the devices and systems of FIGS. 7-8 may implement those steps instead. For example, the steps of process 1000 may be executed by server 804 and/or by user equipment device 807, 808, and/or 810 to selectively stream content based on parental control ratings.

At 1002, input/output (I/O) circuitry (e.g., I/O path 812) of a server (e.g., media server 408 of FIG. 4, which may correspond to server 804 of FIG. 8) may receive a request to play or customize portions of a media asset (e.g., receive from a client device a selection of option 407 or 409 included in GUI 411 associated with media listing 404 of a "Movie A" of FIG. 4).

At 1004, in response to receiving such request, I/O circuitry of the server (e.g., media server 408 of FIG. 4) may transmit a manifest (e.g., manifest 410 of FIG. 4) to a client device (e.g., client device 402 of FIG. 4). The manifest may identify sequential segments (e.g., segments 401, 403, 405 of FIG. 4) of the media asset associated with the request, and identify at least one particular segment having multiple versions (e.g., versions 404, 406, 408 of segment 401; versions 416, 418 of segment 403; versions 426, 428, 430 of segment 405 of FIG. 4).

At 1006, control circuitry (e.g., control circuitry 704 of device 700 of FIG. 7 and/or control circuitry 811 of server 804 of FIG. 8) may determine whether the manifest indicates that multiple segments have respective multiple versions.

At 1008, if only one segment has multiple versions, control circuitry (e.g., of media server 408 of FIG. 4) may cause the client device (e.g., user equipment 808 of FIG. 8) to generate for display a GUI (e.g., GUI 411 of FIG. 4) simultaneously depicting a portion of each respective version of the particular segment (e.g., portions of versions 304, 306, 308 of FIG. 3), and respective selectable options (e.g., options 310, 312, 314 of segment 301 of FIG. 3) associated with the respective versions of the particular segment. In some embodiments, the control circuitry of the server may cause the client device to generate for display parental control information (e.g., parental control information 307 of FIG. 3) indicative of objectionable content in the version, and/or subtitle information (e.g., subtitle information 321 of FIG. 3) indicative of objectionable content in the associated version (e.g., subtitle information 321 of version 316 of FIG. 3).

At 1010, control circuitry (e.g., of media server 408 of FIG. 4) may receive from the client device selection of a first version of the particular segment (e.g., version 406 of segment 401 of FIG. 4). For example, it may be desirable for a first user (e.g., a parent) to select a version of a scene that is not violent (e.g., version 406 of FIG. 4 as compared to version 404 of FIG. 4) when viewing the media asset with a second user (e.g., a young child).

At 1012, if multiple segments have multiple respective versions, control circuitry (e.g., of media server 408 of FIG. 4) may cause the client device to generate for display a GUI (e.g., GUI 411 of FIG. 4) simultaneously depicting a portion of each respective version of segments having multiple versions (e.g., portions of versions 304, 306, 308 of segment 301 of FIG. 3; portions of versions 316, 318 of segment 303 of FIG. 3; portions of versions 326, 328, 330 of segment 305 of FIG. 3) and respective selectable options (e.g., options 310, 312, 314 of FIG. 3; options 320, 322 of FIG. 3; options 332, 334, 336 of FIG. 3) associated with the respective versions of each such segment.

At 1014, control circuitry (e.g., of media server 408 of FIG. 4) may receive from the client device (e.g., device 402 of FIG. 4) for each respective segment (e.g., segments 401, 403, 405 of FIG. 4) having multiple versions, selection of a version of the particular segment (e.g., selected versions 406, 418, 430 of segments 401, 403, 405, respectively, of FIG. 4).

At 1016, control circuitry (e.g., of media server 408 of FIG. 4) may cause the client device to begin playing the media asset (e.g., "Movie A" associated with listing 404 of FIG. 4), such as in response to receiving a request to play the media asset (e.g., option 407) or after receiving each selected version of the respective segments of the media asset. The playing of the media asset may be performed in accordance with the received selections (e.g., selected versions 406, 418, 430 of segments 401, 403, 405 may be received by the client device at the appropriate time corresponding to the time stamp of the segment within the presentation of the media asset).

At 1018, control circuitry (e.g., media server 408 of FIG. 4) may determine, while playing the media asset (e.g., "Movie A" associated with listing 404 of FIG. 4), whether the next segment has a corresponding selected version (e.g., version 406 of segment 401 of FIG. 4). If the control circuitry determines the next segment does not have a selected version (e.g., the next segment does not have multiple versions, or the user did not select a preference of a version) the control circuitry may transmit at 1022 a default version of the segment to the client device (e.g., in accordance with local parental control settings).

At 1020, control circuitry (e.g., of media server 408 of FIG. 4) may transmit to the client device (e.g., client device 402 or client device 420 of FIG. 4) the selected version of the segment (e.g., version 406 of segment 401 of FIG. 4). Processing may then return to 1018 (e.g., determine whether the next segment, after version 406 of segment 401 of FIG. 4, has an associated selected version of such next segment).

Figure 11:
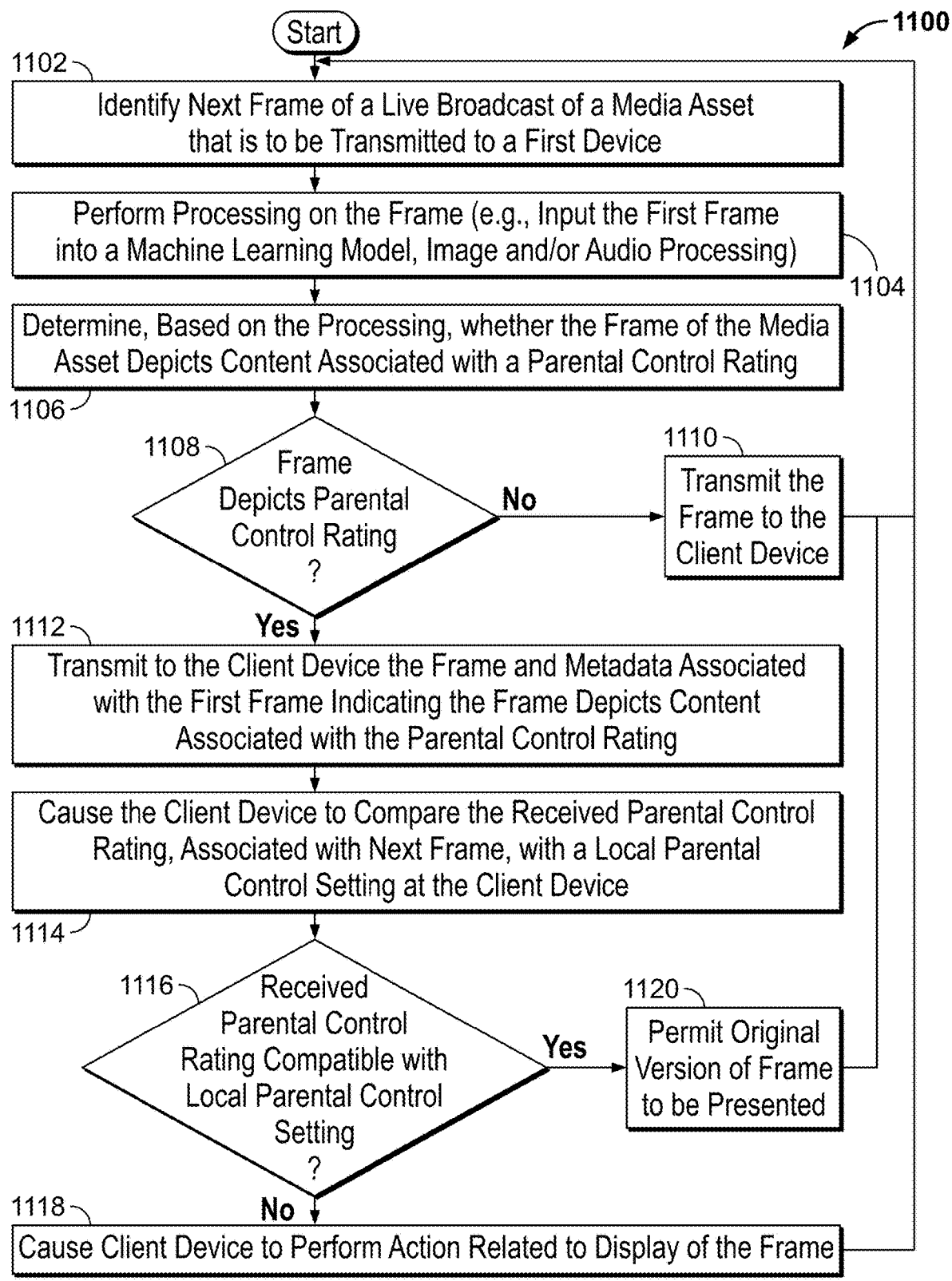
FIG. 11 is a flowchart of a detailed illustrative process for monitoring frames of a live broadcast of a media asset based on parental control ratings, in accordance with some embodiments of this disclosure.

FIG. 11 is a flowchart of a detailed illustrative process 1100 for monitoring frames of a live broadcast of a media asset based on parental control ratings, in accordance with some embodiments of this disclosure. In various embodiments, the individual steps of process 1100 may be implemented by one or more components of the devices and systems of FIGS. 7-8. Although the present disclosure may describe certain steps of process 1100 (and of other processes described herein) as being implemented by certain components of the devices and systems of FIGS. 7-8, this is for purposes of illustration only, and it should be understood that other components of the devices and systems of FIGS. 7-8 may implement those steps instead. For example, the steps of process 1100 may be executed by server 804 and/or by user equipment device 807, 808, and/or 810 to selectively streaming content based on parental control ratings.

At 1102, control circuitry (e.g., control circuitry of media server 508 of FIG. 5) may identify a next frame of a live broadcast of a media asset that is to be transmitted to a first device. For example, the media server may receive a request from a client device (e.g., device 502 of FIG. 5) to access the media asset (e.g., a live broadcast of a soccer match).

At 1104, control circuitry (e.g., control circuitry of media server 508 of FIG. 5) may perform processing on the next frame (e.g., pre-process the frame into one or more vectors and/or input the frame into a machine learning model, such as the neural network model shown in FIG. 6, and/or perform image and/or audio processing).

At 1106, control circuitry (e.g., control circuitry of media server 508 of FIG. 5) may determine, based on the processing performed at 1104, whether the frame of the media asset depicts content associated with a parental control rating (e.g., whether the frame contains nudity 606, violence 608, profanity 610, mature behavior 612 of FIG. 6).

At 1108, upon determining the frame does not depict content associated with a parental control rating, the frame may be sent by control circuitry (e.g., control circuitry of media server 508 of FIG. 5) in its original form to the client device, at 1110.

At 1112, upon determining the frame does not depict content associated with a parental control rating, the frame may be sent by control circuitry (e.g., control circuitry of media server 508 of FIG. 5) along with associated metadata (e.g., metadata 552 including parental control rating 554 of FIG. 5). In some embodiments, the metadata may indicate that the one or more analyzed frames contain objectionable content (e.g., violence, nudity, profane language and/or an "R" rating).

At 1114, control circuitry (e.g., control circuitry of media server 508 of FIG. 5) may cause a client device (e.g., device 502 of FIG. 5) to compare the received parental control rating (e.g., parental control rating 554 of FIG. 5) with a local parental control setting at the client device (e.g., restricting content with ratings of "Ages 12 and over").

At 1116, upon determining, at the client device (e.g., device 502 of FIG. 5), based on the comparison of 1114, that the parental control rating is compatible with the local parental control setting at the client device, the original version of the frame may be transmitted to the client device, at 1120 (e.g., if the local parental control setting indicates content rated PG-13 is acceptable, and the received parental control rating is PG-13).

At 1118, upon determining, at the client device (e.g., device 502 of FIG. 5), based on the comparison of 1114, that the parental control rating is incompatible with the local parental control setting at the client device, control circuitry (e.g., control circuitry of media server 508 of FIG. 5) may cause the client device to perform an action (e.g., insert blank frame in place of the objectionable content, substitute replacement content in place of the objectionable content, etc.) related to the display of the frame. Such actions are discussed in more detail in connection with FIG. 12.

Figure 12:
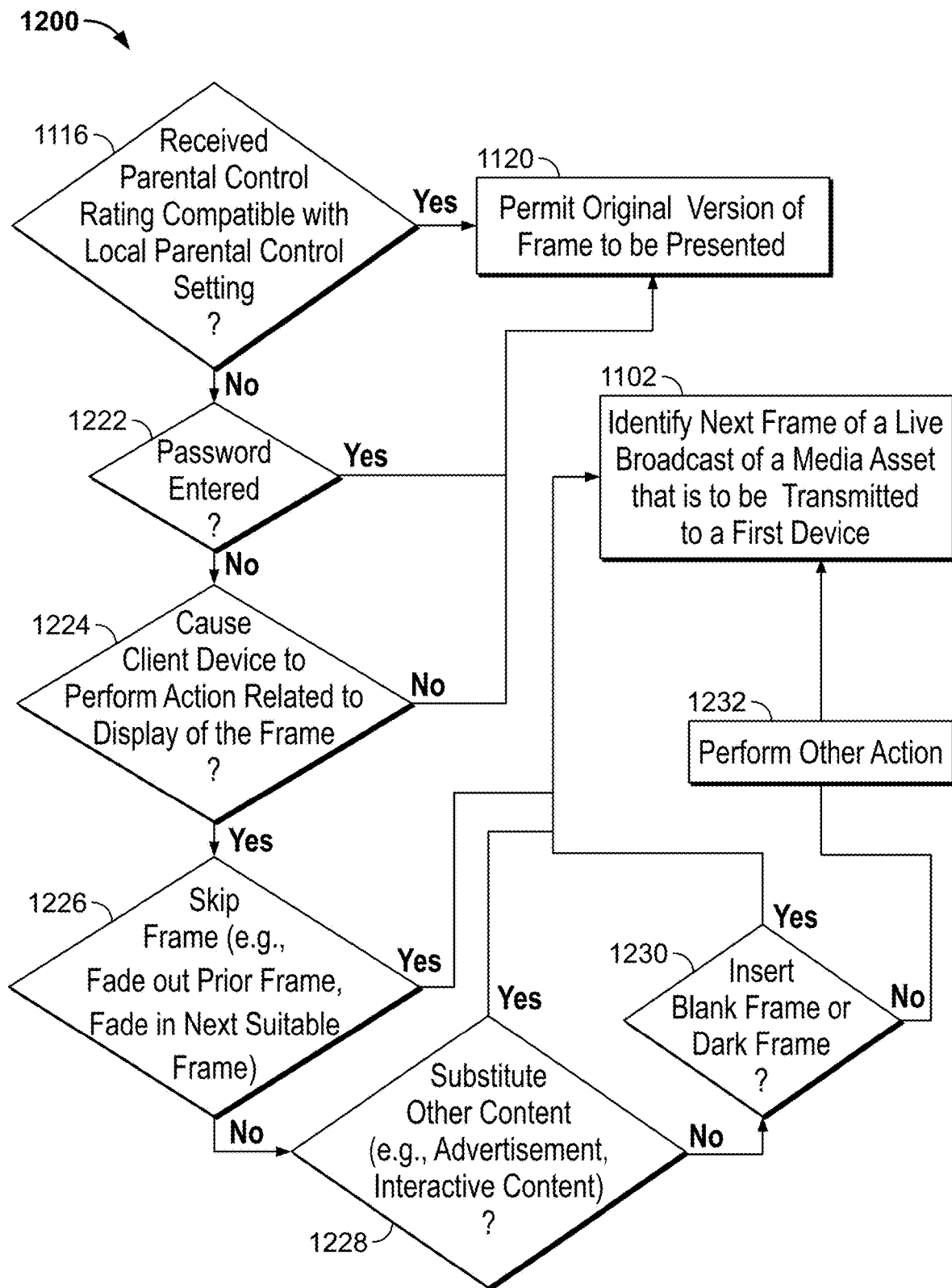
FIG. 12 is a flowchart of a detailed illustrative process for causing a client device to perform an action related to the monitoring of a live broadcast of a media asset based on parental control ratings, in accordance with some embodiments of this disclosure.

FIG. 12 is a flowchart of a detailed illustrative process 1200 for causing a client device to perform an action related to the monitoring of a live broadcast of a media asset based on parental control ratings, in accordance with some embodiments of this disclosure. In various embodiments, the individual steps of process 1200 may be implemented by one or more components of the devices and systems of FIGS. 7-8. Although the present disclosure may describe certain steps of process 1200 (and of other processes described herein) as being implemented by certain components of the devices and systems of FIGS. 7-8, this is for purposes of illustration only, and it should be understood that other components of the devices and systems of FIGS. 7-8 may implement those steps instead. For example, the steps of process 1200 may be executed by server 804 and/or by user equipment device 807, 808, and/or 810 to selectively stream content based on parental control ratings.

At 1222, control circuitry of a server (e.g., media server 508 of FIG. 5) may cause the client device (e.g., device 502 of FIG. 5) to prompt entry of a password or PIN in order to override the local parental control setting. Such prompt may be provided, for example, in response to determining at 1116 of FIG. 11 that the parental control rating is incompatible with the local parental control setting at the client device.

At 1224, control circuitry (e.g., of media server 508 of FIG. 5) may cause the client device to perform an action related to display of the frame. It should be understood that any one of these actions may performed. Alternatively, any two, or any combination, of these actions may be performed. While all of steps 1224-1232 are shown, it should be appreciated that some of these steps may be optional or excluded.

At 1226, control circuitry of a server (e.g., media server 508 of FIG. 5) may cause the client device (e.g., device 502 of FIG. 5) to skip the frame associated with the parental rating information (e.g., containing objectionable content incompatible with a local parental control setting of the client device). For example, the server may cause the client device to fade out of the prior scene, and fade in to the next suitable scene after the objectionable content concludes.

Additionally or alternatively, control circuitry of a server (e.g., media server 508 of FIG. 5) may cause the client device (e.g., device 502 of FIG. 5) at 1228 to substitute other content (e.g., advertisement, interactive content, supplemental content, etc.) for the objectionable content. In some embodiments, the advertisements may be directed to younger users, and/or may be related to the media asset (e.g., a trailer for a sequel to the current media asset). A prompt to enter a password may be available at any point during the replacement content to enable a user to view the objectionable content. In some embodiments, a first user (e.g., a parent) may receive from the media server at a mobile device (e.g., device 502 of FIG. 5) the skipped-over or substituted frame, and/or such frame may be stored for later viewing (e.g., to enable a parent to view the content at a later time, or while the frame is being skipped over on another device, such as a smart television, while still keeping a younger user from viewing the potentially objectionable content).

Additionally or alternatively, control circuitry of a server (e.g., media server 508 of FIG. 5) may cause the client device (e.g., device 502 of FIG. 5) at 1230 to present a blank or dark screen for the duration of the objectionable content. In some embodiments, a user may be able to fast-forward or rewind through such blank or dark frame.

Additionally or alternatively, control circuitry of a server (e.g., media server 508 of FIG. 5) may cause the client device (e.g., device 502 of FIG. 5) at 1232 to perform another action. For example, the channel may be automatically changed, or the scene automatically fast-forwarded (e.g., based on instructions received from the server). As another example, a playlist of each objectionable scene may be compiled and transmitted to a first user (e.g., a parent) at a later time. Processing may then return to 1102 of FIG. 11.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, from a server at a client device, a manifest of a media asset, wherein the manifest identifies: (a) a plurality of sequential segments of the media asset, each respective sequential segment of the plurality of sequential segments being associated with a different time period within a duration of the media asset, and (b) for each respective sequential segment of the plurality of sequential segments, a plurality of versions of the respective sequential segment of the plurality of sequential segments;
   generating for display a graphical user interface that simultaneously depicts, for each respective sequential segment of the plurality of sequential segments:
     a respective preview of each respective version of the plurality of versions of the respective sequential segment, wherein for each sequential segment of the plurality of sequential segments, at least one of the previews presented via the graphical user interface depicts potentially objectionable content included in the corresponding version; and
     a plurality of selectable options, wherein each respective selectable option of the plurality of selectable options is associated with a respective version of the respective sequential segment and is associated with a respective preview of the respective version, wherein each respective selectable option for a particular version is depicted at a portion of the graphical user interface that is different from a portion of the graphical user interface at which the corresponding preview of the particular version is depicted;
   receiving, at the client device and for each respective sequential segment, a selection of an option, of the plurality of selectable options, that is associated with a respective version of the plurality of versions of the respective sequential segment; and
   during playing of the media asset, in response to determining that a particular segment of the plurality of sequential segments is the next segment to be played:
     requesting from the server a version of the particular segment associated with the selected option for the particular segment.

2. The method of claim 1, wherein the graphical user interface further depicts:
   parental control information for each respective preview of each respective version of the plurality of versions of the particular segment, wherein the parental information is identified in the manifest and indicates at least one of the versions of the plurality of versions of the particular segment contains potentially objectionable content.

3. The method of claim 1, wherein each respective preview comprises:
   a key frame from each respective version of the particular segment, wherein the key frame comprises potentially objectionable content associated with the respective preview.

4. The method of claim 1, wherein at the graphical user interface further comprises:
   subtitle information which is depicted in the graphical user interface in association with the at least one preview and which specifies subtitles of audio corresponding to the potentially objectionable content of a version, of the plurality of versions, that corresponds to the at least one preview.

5. The method of claim 1, wherein each respective preview comprises:

an animation or trick play content associated with the respective preview.

6. The method of claim 1, wherein:
the playing of the media asset occurs at a device other than the client device.

7. The method of claim 1, further comprising:
transmitting a request to play the media asset; and
receiving, without generating for display the graphical user interface, an initial segment of the plurality of segments comprising the particular segment.

8. A system comprising:
control circuitry configured to:
  receive, from a server at a client device, a manifest of a media asset, wherein the manifest identifies: (a) a plurality of sequential segments of the media asset, each respective sequential segment of the plurality of sequential segments being associated with a different time period within a duration of the media asset, and (b) for each respective sequential segment of the plurality of sequential segments, a plurality of versions of the respective sequential segment of the plurality of sequential segments;
display circuitry configured to:
  generate for display a graphical user interface that simultaneously depicts, for each respective sequential segment of the plurality of sequential segments:
    a respective preview of each respective version of the plurality of versions of the respective sequential segment, wherein for each sequential segment of the plurality of sequential segments, at least one of the previews presented via the graphical user interface depicts potentially objectionable content included in the corresponding version; and
    a plurality of selectable options, wherein each respective selectable option of the plurality of selectable options is associated with a respective version of the respective sequential segment and is associated with a respective preview of the respective version, wherein each respective selectable option for a particular version is depicted at a portion of the graphical user interface that is different from a portion of the graphical user interface at which the corresponding preview of the particular version is depicted;
wherein the control circuitry is further configured to:
  receive, at the client device and for each respective sequential segment, a selection of an option, of the plurality of selectable options, that is associated with a respective version of the plurality of versions of the particular segment; and
  during playing of the media asset, in response to determining that a particular segment of the plurality of sequential segments is the next segment to be played:
    request from the server a version of the particular segment associated with the selected option for the particular segment.

9. The system of claim 8, wherein the display circuitry causes the graphical user interface to further depict:
parental control information for each respective preview of each respective version of the plurality of versions of the particular segment, wherein the parental information is identified in the manifest and indicates at least one of the versions of the plurality of versions of the particular segment contains potentially objectionable content.

10. The system of claim 8, wherein each respective preview comprises:
a key frame from each respective version of the particular segment, wherein the key frame comprises potentially objectionable content associated with the respective preview.

11. The system of claim 8, wherein the control circuitry is configured to cause the graphical user interface to further comprise:
subtitle information which is depicted in the graphical user interface in association with the at least one preview depicted in the graphical user interface and which specifies subtitles of audio corresponding with the potentially objectionable content of a version, of the plurality of versions, that corresponds to the at least one portion.

12. The system of claim 8, wherein each respective preview comprises:
an animation or trick play content associated with the respective preview.

13. The system of claim 8, wherein:
the playing of the media asset occurs at a device other than the client device.

14. The system of claim 8, wherein the control circuitry is further configured to:
transmit a request to play the media asset; and
receive, without generating for display the graphical user interface, an initial segment of the plurality of segments comprising the particular segment.

15. A method comprising:
transmitting, from a server to a client device, a manifest of a media asset, wherein the manifest identifies: (a) a plurality of sequential segments of the media asset, each respective sequential segment of the plurality of sequential segments being associated with a different time period within a duration of the media asset, and (b) for each respective sequential segment of the plurality of sequential segments, a plurality of versions of the respective sequential segment of the plurality of sequential segments;
causing the client device to generate for display a graphical user interface that simultaneously depicts, for each respective sequential segment of the plurality of sequential segments:
  a respective preview of each respective version of the plurality of versions of the respective sequential segment, wherein for each sequential segment of the plurality of sequential segments, at least one of the previews presented via the graphical user interface depicts potentially objectionable content included in the corresponding version; and
  a plurality of selectable options, wherein each respective selectable option of the plurality of selectable options is associated with a respective version of the respective sequential segment and is associated with a respective preview of the respective version, wherein each respective selectable option for a particular version is depicted at a portion of the graphical user interface that is different from a portion of the graphical user interface at which the corresponding preview of the particular version is depicted;
receiving, at the server from the client device, for each respective sequential segment, a selection of an option, of the plurality of selectable options, that is associated with a respective version of the plurality of versions of the respective sequential segment; and during playing of the media asset, in response to receiving an indication that a particular segment of the plurality of sequential segments is the next segment to be played:

transmitting to the client device a version of the particular segment associated with the selected option for the particular segment.

16. The method of claim 15, wherein the graphical user interface further depicts:

parental control information for each respective preview of each respective version of the plurality of versions of the particular segment, wherein the parental information is identified in the manifest and indicates at least one of the versions of the plurality of versions of the particular segment contains potentially objectionable content.

17. The method of claim 15, wherein each respective preview comprises:

a key frame from each respective version of the particular segment, wherein the key frame comprises potentially objectionable content associated with the respective preview.

18. The method of claim 15, wherein the graphical user interface further comprises:

subtitle information which is depicted in the graphical user interface in association with the at least one preview and which specifies subtitles of audio corresponding to the potentially objectionable content of a version, of the plurality of versions, that corresponds to the at least one preview.

19. The method of claim 15, wherein each respective preview comprises:

an animation or trick play content associated with the respective preview.

20. The method of claim 15, wherein:

the playing of the media asset occurs at a device other than the client device be requested from the server.

* * * * *